United States Patent
Amatucci et al.

(10) Patent No.: US 9,484,594 B2
(45) Date of Patent: Nov. 1, 2016

(54) METAL FLUORIDE COMPOSITIONS FOR SELF FORMED BATTERIES

(75) Inventors: Glenn G. Amatucci, Peapack, NJ (US); Anna Halajko, Parlin, NJ (US); Fadwa Badway, Old Bridge, NJ (US)

(73) Assignee: Rutgers, The State University of New Jersey, New Brunswick, NJ (US)

( * ) Notice: Subject to any disclaimer, the term of this patent is extended or adjusted under 35 U.S.C. 154(b) by 460 days.

(21) Appl. No.: 13/639,812

(22) PCT Filed: Nov. 9, 2010

(86) PCT No.: PCT/US2010/056026
§ 371 (c)(1),
(2), (4) Date: Oct. 5, 2012

(87) PCT Pub. No.: WO2011/057263
PCT Pub. Date: May 12, 2011

(65) Prior Publication Data
US 2013/0048924 A1    Feb. 28, 2013

Related U.S. Application Data

(60) Provisional application No. 61/280,815, filed on Nov. 9, 2009.

(51) Int. Cl.
*H01M 4/88* (2006.01)
*H01M 10/052* (2010.01)
(Continued)

(52) U.S. Cl.
CPC ............. *H01M 10/052* (2013.01); *H01M 4/38* (2013.01); *H01M 4/587* (2013.01); *H01M 4/663* (2013.01); *H01M 10/0561* (2013.01); *H01M 2300/008* (2013.01); *Y02E 60/122* (2013.01)

(58) Field of Classification Search
CPC ........ C01D 15/05; H01M 4/38; H01M 4/40; H01M 4/62; H01M 4/364; H01M 4/381
USPC ........ 252/519.4, 519.5, 520.1; 429/188, 101, 429/309; 205/411
See application file for complete search history.

(56) References Cited

U.S. PATENT DOCUMENTS 4,312,718 A * 1/1982 Watanabe et al. ............ 205/411
4,367,267 A * 1/1983 Oi .................................. 429/101

(Continued)

FOREIGN PATENT DOCUMENTS

EP    0651450 A1    5/1995
EP    0938147 A2    8/1999

(Continued)

OTHER PUBLICATIONS

Poizot, P. et al., "Nano-sized transition-metal oxides as negative-electrode materials for lithium-ion batteries", Nature, Sep. 28, 2000; 407 (6803): pp. 496-499.

(Continued)

*Primary Examiner* — Khanh Tuan Nguyen
(74) *Attorney, Agent, or Firm* — Greenberg Traurig, LLP

(57) ABSTRACT

The described invention provides compositions related to an electronically insulating amorphous or nanocrystalline mixed ionic conductor composition comprising a metal fluoride composite to which an electrical potential is applied to form 1) a negative electrode, and 2) a positive electrode, wherein the negative electrode and positive electrode are formed in situ.

23 Claims, 22 Drawing Sheets

(51) Int. Cl.
  H01M 4/38     (2006.01)
  H01M 4/587    (2010.01)
  H01M 4/66     (2006.01)
  H01M 10/0561  (2010.01)

(56) References Cited

U.S. PATENT DOCUMENTS

| | | | |
|---|---|---|---|
| 5,069,764 A * | 12/1991 | Watanabe et al. ............ | 205/411 |
| 5,965,293 A | 10/1999 | Idota et al. | |
| 6,037,095 A | 3/2000 | Miyasaka | |
| 9,048,497 B2 | 6/2015 | Amatucci et al. | |
| 2006/0019163 A1 | 1/2006 | Amatucci et al. | |
| 2006/0210883 A1* | 9/2006 | Chen ..................... | H01M 4/131 |
| | | | 429/326 |
| 2008/0034579 A1 | 2/2008 | Potanin | |
| 2008/0102373 A1 | 5/2008 | Potanin | |
| 2008/0199772 A1 | 8/2008 | Amatucci et al. | |
| 2009/0004560 A1 | 1/2009 | Amatucci et al. | |
| 2009/0029237 A1 | 1/2009 | Yazami | |
| 2013/0048924 A1 | 2/2013 | Amatucci et al. | |
| 2014/0117291 A1 | 5/2014 | Amatucci | |

FOREIGN PATENT DOCUMENTS

| | | |
|---|---|---|
| JP | 2008-527652 A | 7/2008 |
| JP | 2008-537312 A | 9/2008 |
| JP | 2008-538649 A | 10/2008 |
| JP | 2009-529222 A | 8/2009 |
| WO | 2006078472 A2 | 7/2006 |
| WO | 2007/146453 A2 | 12/2007 |
| WO | 2007146453 A2 | 12/2007 |
| WO | 2008095197 A2 | 8/2008 |
| WO | 2011057263 A1 | 5/2011 |

OTHER PUBLICATIONS

Bervas, M. et al., "Investigation of the Lithiation and Delithiation Conversion Mechanisms of Bismuth Flouride Nanocomposites", J. Electrochem. Soc. 2006, vol. 153, Issue 4, pp. A799-A808.

Bervas, M. et al., "Bismuth Flouride Nanocomposite as a Positive Electrode Material for Rechargeable Lithium Batteries", Electrochem. Solid-State Lett. 2005, vol. 8, Issue 4, pp. A179-A183.

Bervas, M. et al., "Rerversible Conversion Reactions with Lithium in Bismuth Oxyfluoride Nanocomposites", J. Electrochem. Soc. 2006, vol. 153, Issue 1, pp. A159-A170.

Badway, F. et al., "High-Capacity Reversible Metal Fluoride Conversion Materials as Rechargeable Positive Electrodes for Li Batteries", J. Electrochem. Soc. 2003, vol. 150, Issue 10, pp. A1318-A1327.

Badway, F. et al., "Carbon-Metal Fluoride Nanocomposites: Structure and Electrochemistry of FeF 3 : C", J. Electrochem. Soc. 2003, vol. 150, Issue 9, pp. A1209-A1218.

Badway, F. et al., "Structure and Electrochemistry of Copper Fluoride Nanocomposites Utilizing Mixed Conducting Matrices", Chem. Mater. 2007, vol. 19, pp. 4129-4141.

Pereira, N. et al., "Iron Oxyfluorides as High Capacity Cathode Materials for Lithium Batteries", J. Electrochem. Soc. 2009, vol. 156, Issue 6, pp. A407-A416.

Amatucci, G. et al., "Fluoride based electrode materials for advanced energy storage devices", Journal of Fluorine Chemistry, vol. 128, 2007, pp. 243-262.

Adam, J.-L., "Fluoride glass research in France: fundamentals and applications", Journal of Fluorine Chemistry, vol. 107, 2001, pp. 265-270.

Poulain, M. "Advanced Glasses", Ann. Chim. Sci. Mat., vol. 28, 2003, pp. 87-94.

Sorokin, N.I., "Anion-conducting fluoride and oxyfluoride glasses", Russian Chemical Reviews, vol. 70, 2001, Issue 9, pp. 801-807.

Bobe, J.M. et al., "Ion conductivity and diffusion in ZrF4-based fluoride glasses containing LiF ($0 \leq x \text{ LiF} \leq 0.60$)", Journal of Non-Crystalline Solids, vol. 209, 1997, pp. 122-136.

Dugat, P. et al., "Crystal Structures of Li4ZrF8 and Li3Zr4F19 and Reinvestigation of the LiF—ZrF4 Phase Diagram", Journal of Solid State Chemistry, vol. 120, 1995, pp. 187-196.

Ghosh S. et al., "Electrical conductivity and conductivity relaxation in mixed alkali fluoride glasses", Solid State Ionics, vol. 149, 2002, pp. 67-72.

Savchuk, R. N. et al., "The Chemical Behaviour of LaF3, YbF3 in Molten Salt NaF—ZrF4—Zr Mixtures", 210th ECS Meeting, Abstract #2004, Copyright ECS 2006.

Savchuk, R. N. et al., "Investigation of the Interaction of Components in the System NaF'LiF—LaF3", 218th ECS Meeting, Abstract #2193 Copyright 2010 The Electrochemical Society, vol. 7, Issue 7, 2010.

Ghosh, S. et al., "Mixed mobile ion effect in fluorozincate glasses", J. Phys.: Condens. Matter, vol. 17, 2005, pp. 3463-3472.

Ghosh, S. et al., "Ion dynamics and mixed mobile ion effect in fluoride glasses", Journal of Applied Physics, vol. 97, 2005, pp. 123525-1.

Sural, M. et al., "Conductivity relaxation in zirconium fluoride glasses: effect of substitution of Zr4+ by Y3+ ions" Solid State Ionics, vol. 120, 1999, pp. 27-32.

El-Hofy, M. et al., "Ionic conductivity in lithium haloborate glasses", Phys. Stat. Sol. (a), vol. 199, No. 3, 2003, pp. 448-456.

Plitz, I. et al., "Structure and Electrochemistry of Carbon-Metal Fluoride Nanocomposites Fabricated by Solid-State Redox Conversion Reaction", J. Electrochem. Soc. 2005, vol. 152, Issue 2, pp. A307-315.

Tarascon, J.-M. et al., "Issues and challenges facing rechargeable lithium batteries", Nature, vol. 414, 2001, pp. 359-367.

Arico, A. et al., "Nanostructured materials for advanced energy conversion and storage devices", Nature Mat., 4, 2005, pp. 366-377.

Trnovcova, V. et al., "Physical Properties of Multicomponent Fluoride Glasses for Photonic and Superionic Applications", Ionics, 7, 2001, pp. 456-462.

Xiujian, et al., "Mixed-alkali effect in fluorozirconate glasses", Journal of Materials Science Letters, 6, (1987), pp. 143-144.

Notification of Third Office Action dated Oct. 26, 2015, issued by the State Intellectual Property Office of the People's Republic of China in Chinese Application No. 201080050848.5 (15 pages).

Translation of the Examiner's Comments, issued by the Japanese Patent Office in Japanese Patent Application No. 2012-538086 (3 pages).

* cited by examiner

METAL FLUORIDE COMPOSITIONS FOR SELF FORMED BATTERIES

CROSS REFERENCE TO RELATED APPLICATIONS

This application claims benefit of priority to the International Patent Application Ser. No. PCT/US2010/056026, entitled "Metal fluoride compositions for self-formed batteries", filed Nov. 9, 2010, which claims priority to U.S. Application No. 61/280,815, entitled "Metal fluoride compositions for self-formed batteries," filed Nov. 9, 2009, the content of each of which is incorporated by reference herein in its entirety.

STATEMENT OF GOVERNMENT FUNDING

This invention was made with government support. The government has certain rights in the invention.

FIELD OF THE INVENTION

The described invention relates to primary and secondary electrochemical energy storage systems, particularly to such systems as battery cells, which use materials that take up and release ions as a means of storing and supplying electrical energy.

BACKGROUND

Electrochemical energy storage devices such as batteries are becoming increasingly important to the rapid development of a wide variety of technologies ranging from small neural stimulators to electric vehicles. Addressing the power demands of these devices requires attention to a variety of performance factors. Although each application has a differing set of priorities almost all have the same set of needs. These include greater gravimetric and volumetric energy density, lower cost, an increase in the ease of cell fabrication, and improved safety. For the past two decades, Li-ion technology has been the premiere battery technology and has evolved little since its first introduction. In this technology, both the positive and negative electrodes operate on the basis of intercalation reactions where guest ions insert into a stable crystalline host structure. For the positive electrode, this host structure typically has been layered ($LiCoO_2$) or three dimensional ($LiMn_2O_4$) host metal oxide structures. The positive electrode is the energy limiting electrode of the Li-ion battery. Therefore attention to the improvement of this electrode is key to the improvement of the energy density of the battery. Existing and proposed intercalation materials are limited to the insertion of one lithium and one electron per formula unit; it is imperative for improved energy density that this limitation is extended well beyond one electron and one ion. Recently a concept of conversion materials has been introduced in order to set a stage where two or three electrons can be transferred per transition metal thereby increasing the energy density of the battery by at least a factor of two (see Poizot, P., et al., Nature. 2000 Sep. 28; 407(6803):496-9, the entire content of which is incorporated herein by reference). The most proficient conversion materials in this respect have been the class of metal fluoride nanocomposites (see U.S. Ser. No. 11/813,309; PCT/US06/00448; U.S. 60/727,471; U.S. 60/641,449; Bervas, M., et al., J. Electrochem. Soc. 2006. 153(4):A799-A808; Bervas, M., et al., Electrochem. Solid-State Lett. 2005. 8(4): A179-A183; Bervas, M., et al., J. Electrochem. Soc. 2006. 153(1): A159-A170; Badway, F., et al., J. Electrochem. Soc. 2003. 150(10): A1318-A1327; Badway, F., et al., J. Electrochem. Soc. 2003. 150(9): A1209-A1218; Badway, F., et al., Chem. Mater. 2007. 19:4129-4141; Pereira, N., J. Electrochem. Soc. 2009. 156(6):A407-A416; Amatucci, G. G., and Pereira, N., J. Fluorine Chem. 2007. 128:243-262; the contents of each of which are incorporated by reference herein in their entirety). During the discharge or lithiation reaction, the metal fluorides are reduced to the metal and LiF in a sub-nanocomposite of dimensions <5 nm. The metal fluoride material is reformed during the subsequent charge or delithiation. This can be performed many times over, thus affording rechargeability to the technology. The metal fluorides themselves are insulators, but such appreciable electrochemical activity is made possible by the formation of nanocomposites, which enable the electrochemical activity of the materials.

In many instances, a self formed battery based on fluoride electrodes would be of interest and offers many important attributes. For example, without limitation, the use of a self formed battery would lower the fabrication cost considerably as there would not be any costs associated with individual electrode fabrication. Another example is that as an indefinite reserve battery, at the time of need, the cell would be formed into the highly reactive electrodes that normally would exhibit some degradation if left in storage for long periods of time. Another example is that the cell would be very easy to form into small or conformal dimensions as only one layer of fluoride material would have to be deposited. As another example of high importance, the use of a self formed battery technology would enable the use of metal halide electrodes of exceptional voltage and energy density but extreme reactivity to the ambient environment and poor process stability. Forming such materials in-situ would eliminate the extreme difficulty of handling unstable materials, potential toxicity and especially high cost of fabricating these materials ex-situ. In short the self-formed electrochemical cell is utilized as a chemical factory itself. An example of the impact of this invention can be seen in the theoretical energy density of the successful incorporation of this concept to the in-situ formed Li/Ag—$AgF_2$ couple. This cell energy density would exceed 3500 Wh/L, which is greater than 3× of today's state of the art Li-ion technology.

The described invention relates to electrochemically formed metal halide batteries and provides compositions and examples of a metal fluoride cell in which one of the components is a known glass former. In a further embodiment, the battery may operate through a bi-ion energy storage mechanism where, upon the formation of the battery, a cation and anion, for example Li+ and F−, diffuse to opposing reactive current collectors to form the cell in situ.

SUMMARY

According to one aspect, the described invention provides an electronically insulating amorphous or nanocrystalline mixed ionic conductor composition comprising a metal fluoride composite to which an electrical potential is applied to form: a) a negative electrode; and b) a positive electrode; wherein the negative electrode and positive electrode are formed in situ. Additionally, the composition conducts electricity with ions as charge carriers. Additionally, the conducting ions are cation(s) and anion(s). Additionally, the anion is a fluoride ion. Additionally, the cation is an alkali metal. Additionally, the alkali metal is lithium. Additionally, the amorphous ion conductor composition further comprises a glass former. Additionally, the glass former is a fluoride.

Additionally, the glass former is selected from the group consisting of $AlF_3$, $ZrF_4$, $GaF_3$, $HfF_4$, $YbF_3$, $ThF_3$, $ZnF_2$, $InF_3$, $ZbF_2$, $UF_3$, and $YF_3$. Additionally, the amorphous ion conductor composition further comprises a fluoride glass network modifier. Additionally, the fluoride glass network modifier is a known fluoride conductor or contributes to fluoride conductivity. Additionally, the glass network modifier is selected from the group consisting of $LaF_3$, $BiF_3$, $PbF_2$, KF, $CaF_2$, $BaF_2$, $SnF_2$, $SrF_2$, or a rare earth metal fluoride. Additionally, the lithium further comprises a known lithium ion conductor. Additionally, the lithium is LiF. Additionally, the positive electrode is formed by a reaction with a positive current collector. Additionally, the positive reactive current collector comprises at least one of Ag, Au, Bi, Pb, Sn, Cu, Pt, Pd, Fe, Mn, Ni, Mo, V or a combination thereof. Additionally, the positive reactive current collector comprises at least one of La, Ca, Ba, Sr, O, and S. Additionally, the positive current collector is comprised of carbon. Additionally, the carbon is a carbon selected from a carbon nanotube or graphene. Additionally, the negative electrode is formed by a reaction with a negative current collector. Additionally, the reactive negative current collector comprises at least one of Ag, In, Al, Si, Sn, Ge, Mg, Au, Pd, Bi, Pb, graphite, carbon nanotubes, and graphene. Additionally, the conductor is formed as a compositionally graded material that allows part of the composition to electrochemically oxidize to form the positive electrode or to electrochemically reduce to form the negative electrode. Additionally, a nonaqueous liquid electrode is placed between a negative reactive current collector and amorphous solid state bi-ion conducting electrolyte coated positive reactive current collector. Additionally, a nonaqueous liquid electrolyte is placed between a positive reactive current collector and a solid state bi-ion electrolyte coated negative reactive current collector.

DETAILED DESCRIPTION

Figure 1A:
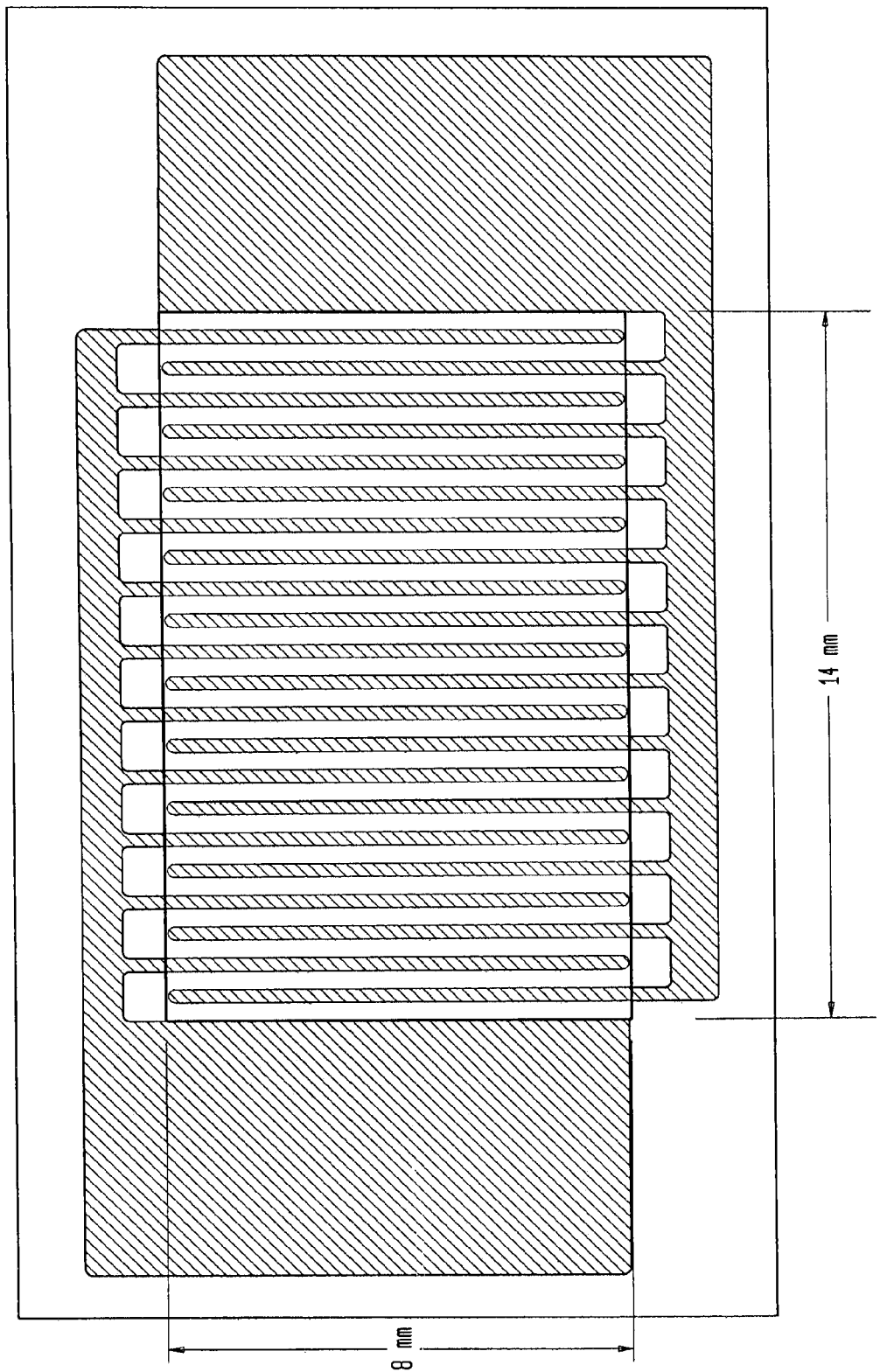
FIG. 1A shows an illustrative interdigitated array (IDA) pattern with digit width of approximately 250 micron with a spacing of approximately 250 micron in a 8 mm×14 mm overall structure with a thickness of approximately 1 micron.

The described invention provides an electrochemically formed battery that comprises at least two conducting ions, a cation and a fluoride anion, that react at opposing current collectors to form the negative and positive electrodes of a battery, respectively, upon the formation of the battery. The described invention utilize a bi-ion conducting electrolyte that can diffuse cations and fluoride anions.

The described invention further provides mixed ion conductors of fluorides and an alkali metal in the nanocrystalline and amorphous state that can be used to fabricate electrochemically self assembled batteries of excellent reversibility and utilization. In some embodiments, the compositions comprise an electrochemically stable glass former that can enhance fluoride conductivity such as, for example, $ZrF_4$, $AlF_3$, $HfF_4$, $GaF_3$, $ScF_3$, $ThF_3$, $InF_3$, and $ZnF_2$ (see Adam, J., J. Fluorine Chem. 2001. 107:265-270; Poulain, M., Ann. Chim. Sci. Mat. 2003. 28:87-94; Trnovcová, V., et al. Ionics. 2001. 7:456-462; Sorokin, N. I., Russian Chem. Rev. 2001. 9:801-807; Bobe, J. M., et al., J. Non-Crystalline Solids. 1997. 209:122-136; Dugat, P., et al. J. Solid State Chem. 1995. 120:187-196; Ghosh, S., and Ghosh, A., Solid State Ionics. 2002. 149:67-72; Savchuk, R. N., et al., 210th Meeting of the Electrochemical Society, 2006 Joint International Meeting, Oct. 29-Nov. 3, 2006. Cancun, Mexico, Abstract; Ghosh, S., and Ghosh, A., J. Phys.: Condens. Matter. 2005. 17:3463-3472; Savchuk, R. N., et al., 218th ECS Meeting, Vol. 7, Issue 7, Oct. 10-Oct. 15, 2010, Las Vegas, Nev., Abstract; Ghosh, S., and Ghosh, A., J. Appl. Physics, 2005. 97:123525; Ghosh, S., and Ghosh, A., J. Phys.: Condens. Matter, 2005. 17:3463-3472; and Sural, M., and Ghosh, A., Solid State Ionics, 1999. 120:27-32, the contents of each of which are incorporated by reference herein in their entirety). Alternatively, in some embodiments, the compositions comprise non-fluoride glass formers, including those of borates and phosphates (see El-Hofy, M., and Hager, I. Z., phys. stat. sol. (a). 2003. 1999, No. 3, 448-456, the content of which is incorporated by reference herein in its entirety), which support cation and/or anion conductivity.

Glossary

The term "amorphous" as used herein means not having long range crystalline structure, or a composite consisting of a nanostructured phase (<100 nm) range and a phase with no order identifiable by x-ray diffraction.

The term "amorphous ion conductor" as used herein refers to a medium without long range crystalline structure (as defined above) that allows ion conduction.

The term "anion" as used herein refers to a negatively charged ion.

The term "carbon nanotube" as used herein refers to an allotrope (meaning one of two or more different structural forms for an element) of carbon that has a cylindrical nanostructure.

The term "cation" as used herein refers to a positively charged ion.

In electrochemistry, the term "charge" is used to refer to the electric charge (physical quantity) with positive or negative integer multiples of the elementary electric charge, e. The sum of charges always is conserved within the time and space domains in which charge is transported. The term "charge" also frequently is used to refer to "positive charge" and "negative charge" just to indicate the sign of it.

The phrase "charge capacity of a battery" refers to the amount of electrical charge that is stored in a battery material and/or in an entire battery electrode. Charge capacity is measured in coulombs. Practically, charge is usually expressed in Ah (ampere hour). 1 Ah is 3600 coulombs. Hence, the charge capacity of one mol of electroactive material that undergoes one electron transfer per process is 1 F or 26.8 Ah. For the practical world of energy storage and conversion, highly important is the specific charge (specific capacity), which is expressed in Ah per 1 gram (Ah $g^{-1}$) for gravimetric specific capacity or in Ah per liter (Ah $L^{-1}$) for volumetric capacity. It is important to distinguish between theoretical and practical specific capacity. "Theoretical specific charge capacity" is based on the molecular weight of the active material and the number of electron transfers in the electrochemical process. "Practical specific charge capacity" is the actual capacity that can be obtained in the process and it depends on many practical factors, such as the kinetic limitations of the electrochemical process, temperature of operation, cutoff voltage, electrodes design and configuration, and the like. In the fields of capacitors and rechargeable batteries, "charge capacity" defines the capacity that is involved in the charge process of the device, and is usually compared to the capacity that is involved in the discharge process ("discharge capacity"). The losses in the charge process should be minimal in order for good cycleability life of a device.

The term "coated" and its various grammatical forms as used herein refers to a thin outer layer or film applied to the surface of an object.

The term "composite" as used herein refers to a compound comprising at least one or more distinct components, constituents, or elements.

The term "conditional glass former" (intermediate) as used herein refers to a compound that does not assume the structure of a glass by itself, but that acts like a glass former when combined with another compound(s).

The term "conduction" as used herein refers to the flow of electrical charge through a medium without the medium itself moving as a whole.

The term "conductive matrix" as used herein refers to a matrix that includes conductive materials, some of which may be ionic and/or electronic conductors. Materials in which the matrix retains both ionic and electronic conductivity commonly are referred to as "mixed conductors."

The term "conductivity" (or "electrical conductivity", or "specific conductance") as used herein refers to the ease with which an electric current can flow through a body. Conductivity may be expressed as siemens per meter.

The term "conductor" (or "electric conductor") as used herein refers to a medium which allows electric current to flow easily. Such a medium may be, for example, a metal wire, a dissolved electrolyte, or an ionized gas, among others.

The term "bi-ion conductor" as used herein refers to a solid state composition, which conducts cations and anions.

The term "crystal" refers to a homogenous solid formed by a repeating, three-dimensional pattern of atoms, ions, or molecules and having fixed distances between constituent parts or the unit cell of such a pattern. The terms "crystal structure" or "crystal lattice" are used interchangeably herein to refer to the arrangement or formation of atoms or ions within the crystal.

The term "current" as used herein refers to the movement of electrical charges in a conductor. The movement of electric charges carried by electrons in an electronic conductor is referred to as an "electronic current." The movement of electrical charges carried by ions in an ionic conductor is referred to as "anionic current".

The term "current collector" as used herein refers to that which gathers electrons. Typically, a current collector is a structural part of an electrode assembly. Its primary purpose is to conduct the electrons between the actual working (reacting) parts of the electrode and the terminals (the external electrical connection posts of an electrochemical cell to which a power source or a load can be connected). Current collector structures can be of interdigitated or opposing planar designs. Alternatively such structures may be of 3-D incorporation within amorphous chemistry. In the invention described herein, such current collectors can be reactive, meaning that upon cell formation, the current collectors react to form electrodes in situ. These are defined as "reactive current collectors."

The term "electrical potential" (or "electric potential") as used herein refers to the work required to bring a unit charge from a reference point to a specific point within an electric field. The reference point usually is considered to be an infinite distance from the specific point, whose potential is considered to be zero. When 1 joule is required to bring 1 coulomb of charge, the potential is equal to 1 volt.

The term "electrolyte" as used herein refers to a compound that dissociates into ions upon dissolution in solvents or/and upon melting, and which provides ionic conductivity. Compounds that possess a high ionic conductivity in the solid state are called "solid electrolytes." "True electrolytes" are those that are build up of ions in the solid state (or pure form), whereas "potential electrolytes" are those that form ions only upon dissolution and dissociation in solvents (i.e., they exist as more or less covalent compounds in pure state).

The term "element" as used herein refers to simple substances which cannot be resolved into simpler substances by normal chemical means.

The term "glass" as used herein refers to an extended, three-dimensional network of atoms that form a solid, which lacks the long-range periodicity (or repeated, orderly arrangement) typical of crystalline materials. Glasses lack the periodic (long range) order of a crystal, have infinite unit cell (no repeating large scale structures), a continuous random network (a three-dimensional network lacking symmetry and periodicity), and are isotropic, having the same average packing and properties in all directions. An "amorphous solid" has no long-range order. In the context of this invention, the term "amorphous" or "glass" is understood to mean that the entire composition or portions of the compositions on a nanometer or micron scale are without long range x-ray diffraction order.

The term "glassy" as used herein refers to structure that is nearly X-ray amorphous with a crystalline structure in the nanometer range. As such, the term "glassy carbon" (vitreous carbon) refers to pure carbon that combines glass-like mechanic characteristics with physical properties of graphite.

The term "glass former" as used herein refers to a compound that can readily assume the structure of a glass or induce a glassy/amorphous structure to compositions, which normally crystallize with long range order. Generally, compounds with small cations form glasses while compounds with large, low valence cations do not form glasses. When a non-glass former is added to a glass former the continuous random network of the glass former is retained but that network has been modified by the addition of the non-glass former. These ionic compounds are called "glass modifiers."

The term "ion conductor" (or "ionic conductor", or "IC") as used herein refers to a material that conducts electricity with ions (meaning an electrically charged chemical particle) as charge carriers (meaning the particle carrying the electrical charge during the flow of electrical current).

The term "ionic liquid" (or "liquid electrolytes", "ionic metals", "ionic fluids", "fused salts", "liquid salts", or "ionic glasses") as used herein refers to salts that form stable liquids. The term "ionic liquid" is inclusive of all classical molten salts, which are composed of more thermally stable ions.

The term "in situ" as used herein means in place or at a specific site.

The term "insulate" and its various grammatical forms as used herein refers to preventing the conduction of electrical, heat or sound energy into or out of a material or body through the use of an insulator.

The term "insulator" (or "electrical insulator") as used herein refers to a material that has sufficiently high resistance to the passage of electric current so that current flow through it is minimal or negligible.

The term "metallic current collector" as used herein refers to a current collector made out of a metal.

The terms "micrometer" or "micron range" are used interchangeably herein to refer to a dimension ranging from about 1 micrometer ($10^{-6}$ m) to about 1000 micrometers.

The term "mixed ionic conductor" as used herein refers to a conductor that exhibits the mobility of at least two ions.

The term "molten" as used herein refers to a liquid state.

The term "nanocrystallite" as used herein refers to a discrete crystallite <100 nm in size or a crystallite <100 nm in size incorporated into a matrix resulting in the formation of a nanocomposite. The final nanocomposite may or may not be of sizes greater than 100 nm.

The terms "nanometer" or "nano range" are used interchangeably to refer to a dimension ranging from about 1 nanometer ($10^{-9}$ m) to about 1000 nanometers.

The term "negative current collector" as used herein refers to a current collector that has gained electrons and has a net negative charge. The negative current collector may be a non reactive metal, such as Ti, Ni, Cu, Mo, Ca, La, Y, Li, or glassy carbon, or can be reactive in such that it may form alloys or intermetallics with electrodeposited atoms such as, but not limited to, Ag, In, Al, Si, Sn, Ge, Mg, Au, Pd, Bi, Pb, graphene, or a mixture of the above, or, in the case of carbon such as, but not limited to, graphite electrodes and carbon nanotubes, may result in the formation of an intercalation compound. In addition, the alloying metal can be contained within the initial fluoride composition of the amorphous chemistry.

The term "positive current collector" as used herein refers to a current collector that has lost electrons and has a net positive charge. Reactive positive current collectors include those metals and compounds that can react with fluorine anions upon the charging of a cell to form a metal or carbon fluoride structure, but are not limited to, those of silver, bismuth, lead, tin, gold, copper, nickel, manganese, iron, cobalt, gold, palladium, and carbon (graphene, carbon nanotubes, graphite). Such current collectors can be formed as a mixed alloy, or as composites with each other or other elements to facilitate the charge transport of the ions and electrons and subsequent formation of a metal or carbon fluoride within the electrode. Other components may be added to the positive current collector, which do not react appreciably with fluoride anions during the charging process. This latter property may be due to a non reactivity at the potentials imparted to the positive electrode, an intrinsic on reactivity at any voltage, or a kinetically hindered non reactivity. As such, such elements will maintain their very high electronic conductivity and enhance the electronic conductivity of the reactive positive electrode components.

The phrase "proximal to" as used herein means in direct contact or within 10 nm.

The term "reactive current collector" refers to the use of an electronically conducting material that initially acts as a current collector, but later transforms in part or whole into an active electrode material by reaction with active ions upon the formation of the electrochemical cell.

The term "negative reactive current collector" as used herein refers to a reactive current collector that has gained electrons (been reduced) and has a net negative charge during the charge process of the electrochemical cell.

The term "positive reactive current collector" as used herein refers to a reactive current collector that has lost electrons (been oxidized) and has a net positive charge during the charge process of the electrochemical cell.

The term "seed crystal" as used herein refers to a small piece of single crystal material from which a large crystal of the same material typically is to be grown. A liquid below its standard freezing point will crystallize in the presence of a seed crystal or nucleus around which a crystal structure can form (nucleation). However, lacking any such nucleus, the liquid phase can be maintained (supercooling). Supercooling is common in liquids that have difficulties forming initial seed crystals.

The phrase "solid state chemistry" (or "solid state forming chemistry") as used herein refers to the study of the synthesis, structure, and physical properties of solid materials.

The term "specific capacity" as used herein refers to the amount of energy a compound contains in milliamp hours (mAh) per unit weight. The term "reversible specific capacity" means that the compound may be recharged by passing a current through it in a direction opposite to that of discharge.

The term "voltage" refers to the measure of the difference in electric potential between two chosen points of space.

The term "watt" ("W") refers to a unit of power. 1 W=1 J s$^{-1}$=1 V A.

I. Electronically Insulating Amorphous and Nanocrystalline Mixed Ionic Conductor Composition According to one aspect, the described invention provides an electronically insulating amorphous or nanocrystalline mixed ionic conductor composition comprising (1) a metal fluoride composite to which an electrical potential is applied to form
  a) a negative electrode, and
  b) a positive electrode,
wherein the negative electrode and positive electrode are formed in situ.

Additionally, the electronically insulating amorphous or nanocrystalline mixed ionic conductor composition conducts electricity with ions as charge carriers.

Conducting Ions

Additionally, the conducting ion is a cation. Further, the cation is an alkali metal. Alkali metals include, but are not limited to, lithium, sodium, potassium, rubidium, caesium, and francium.

Additionally, the amorphous or nanocrystalline mixed ionic conductor composition further comprises a lithium compound. Further, the lithium compound is a known lithium ion conductor. Further, the lithium compound is LiF.

Additionally, the conducting ion is an anion. Further, the anion is a fluoride ion.

Glass Formers

Additionally, the amorphous or nanocrystalline mixed ionic conductor further comprises a glass former. Further, the glass former is a fluoride. Further, the glass former is $ZrF_4$. Further, the glass former is $AlF_3$. Further, the glass former is $HfF_3$. Further, the glass former is $ScF_3$. Further, the glass former is $ThF_3$. Further, the glass former is $InF_3$. Further, the glass former is $ZbF_2$. Further, the glass former is $UF_3$. Further, the glass former is $YF_3$. Further, the glass former is $GaF_3$. Further, the glass former is $ZnF_2$. Further, the glass former is $InF_3$.

Glass Network Modifier

Additionally, the amorphous or nanocrystalline mixed ion conductor further comprises a glass network modifier.

Additionally, the glass network modifier is a fluoride glass network modifier. Further, the fluoride glass network modifier is a known fluoride conductor. Non limiting examples of such conductors include $LaF_3$, $BiF_3$, $PbF_2$, $CaF_2$, $BaF_2$, $SnF_2$, $SrF_2$, or mixtures thereof, to form anion deficient compositions of exceptional conductivity. Further, the fluoride glass network modifier contributes to fluoride conductivity. Non limiting examples of such conductors include $LaF_3$, $BiF_3$, $PbF_2$, $CaF_2$, $BaF_2$, $SnF_2$, $SrF_2$, or mixtures thereof.

Further, the glass network modifier is $CaF_2$. Further, the glass network modifier is $BaF_2$. Further, the glass network modifier is $SrF_2$. Further, the glass network modifier is $LaF_3$. Further, the glass network modifier is a rare earth metal fluoride.

Further, the glass network modifier is LiF. Further, the glass network modifier is $BiF_3$. Further, the glass network modifier is $PbF_2$. Further, the glass network modifier is $SnF_2$. Further, the glass network modifier is $SnF_4$.

Electrode Formation

Additionally, the amorphous or nanocrystalline mixed ionic conductor is formed as a compositionally graded material, which allows part of the composition to electrochemically oxidize to form the positive electrode or to electrochemically reduce to form the negative electrode.

Additionally, the amorphous or nanocrystalline mixed ionic conductor is formed as a composite.

Positive Electrode

Additionally, the composition comprises silver proximal to the positive current collector. Additionally, the composition comprises bismuth proximal to the positive current collector. Additionally, the composition comprises palladium proximal to the positive current collector. Additionally, the composition comprises gold proximal to the positive current collector. Additionally, the composition comprises copper proximal to the positive current collector. Additionally, the composition comprises molybdenum proximal to the positive current collector.

Additionally, the positive electrode is formed by a reaction with a reactive positive current collector. Further, the positive current collector comprises Ag. Further, the positive current collector comprises Au. Further, the positive current collector comprises Bi. Further, the positive current collector comprises Pb. Further, the positive current collector comprises Sn. Further, the positive current collector comprises Cu. Further, the positive current collector comprises Pt. Further, the positive current collector comprises Pd. Further, the positive current collector comprises Mo. Further, the positive current collector comprises V. Thus, primary components include, but are not limited to, Ag, Au, Bi, Pb, Sn, Cu, Pt, Pd, Mo, and V. Other elements that may aid in the F$^-$ conductivity, but are not useful as a positive electrode material due to low voltage and/or capacity include, but are not limited to, K, Ca, La, Ba, Sr, and oxygen.

Additionally, the positive electrode is formed by a reaction with a positive current collector, wherein the positive current collector comprises at least one of Ag, Au, Bi, Pb, Sn, Cu, Pt, Pd, Mo, V, or a combination thereof. Thus, primary components include, but are not limited to, Ag, Au, Bi, Pb, Sn, Cu, Pt, Pd, Mo, and V. Other elements that may aid in the F$^-$ conductivity, but are not useful as a positive electrode material due to low voltage and/or capacity include, but are not limited to, K, Ca, La, Ba, Sr, and oxygen.

Additionally, the positive electrode is formed by a reaction with a positive current collector, wherein the positive current collector comprises carbon. Further, the carbon is a carbon nanotube. Further, the carbon is graphene. Further, the carbon is graphite.

Negative Electrode

Additionally, the negative electrode is formed by a reaction with a negative current collector.

Additionally, the negative current collector can be a non reactive metal, such as Ti, Ni, Cu, Mo, Ca, La, Y, Li, or glassy carbon. Additionally, the negative current collector can be reactive in such that it may form alloys with the electrodeposited Li. Such materials include Ag, In, Al, Si, Sn, Ge, Mg, Au, Pd, Bi, Pb, graphene, and the like, or a mixture of any of the above, or may result in the formation of an intercalation compound in the case of carbon, such as graphite electrodes and carbon nanotubes.

Ionic Liquid

Additionally, the amorphous or nanocrystalline mixed ionic conductor comprises an ionic liquid.

Additionally, a nonaqueous liquid electrolyte is placed between the negative reactive current collector and the amorphous or nanocrystalline electrolyte coated positive reactive current collector. Additionally, a nonaqueous liquid electrolyte is placed between the positive reactive current collector and the amorphous or nanocrystalline electrolyte coated negative reactive current collector. Further, nonaqueous electrolytes include, but are not limited to, a selection of lithium salts such as $LiPF_6$, $LiBF_4$, $LiClO_4$, LiF in various organic solvents including cyclic (propylene carbonate, ethylene carbonate) and acyclic (diethyl carbonate, dimethyl carbonate) carbonates, ethers, boranes (tris(pentafluorophenyl) borane) and nitriles (acetonitrile, methoxypropylnitrile, adiponitrile).

According to another aspect, the described invention provides an electrochemical battery cell comprising:

(1) an electronically insulating amorphous or nanocrystalline mixed ionic conductor composition comprising
  (a) a metal fluoride composite to which an electrical potential is applied to form
    (i) a negative electrode, and
    (ii) a positive electrode,
wherein the negative electrode and positive electrode are formed in situ.

Additionally, use of the described cells in ambient environments will require a near hermetic packaging around such cell. Such packaging is well known to those who practice high energy batteries. Such packaging can include multilayer metal polymer packaging, inorganic nano-layered packaging, packaging containing parylene, glass coatings, and the like.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the described invention, the preferred methods and materials are now described. All publications mentioned herein are incorporated herein by reference to disclose and describe the methods and/or materials in connection with the publications are cited.

It must also be noted that as used herein and in the appended claims, the singular forms "a," "and" and "the" include plural referents unless the context clearly dictates otherwise. All technical and scientific terms used herein have the same meaning The publications discussed herein are provided solely for their disclosure prior to the filing date of the present application. Nothing herein is to be construed as an admission that the described invention is not entitled to antedate such publication by virtue of prior invention. Further, the dates of publication provided may be different from the actual publication dates which may need to be independently confirmed.

It should be understood by those skilled in the art that various changes may be made and equivalents may be substituted without departing from the true spirit and scope of the Invention. In addition, many modifications may be made to adapt a particular situation, material, composition of matter, process, process step or steps, to the objective, spirit and scope of the described invention. All such modifications are intended to be within the scope of the claims appended hereto.

EXAMPLES

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

Example 1

Amorphous Compositions

A variety of primarily amorphous compositions of fluoride and fluoride/Li conductors were fabricated as per Table 1 as examples of the type of compositions useful for the described invention. "Mixtures" refer to the thickness of the sample compositions. "Ag" is utilized as the reactive positive and negative electrode, "Ti" indicates the thickness of the adhesion aid of the Ti deposited between the glass substrate and the Ag interdigitation.

TABLE 1

EXAMPLE OF COMPOSITIONS FABRICATED

| Sample composition (Molar ratios) | Mixtures (nm) | Ti (nm) | Ag (nm) |
|---|---|---|---|
| $AlF_3$-Li (1:1) | 1100 | 11 | 500 |
| $AlF_3$-LiF (1:1) | 1000 | 10 | 500 |
| $AlF_3$-LiF$LaF_3$ (1:2:2) | 1000 | — | 500 |
| $AlF_3$-LiF (1:4) | 1000 | 50 | 500 |
| $AlF_3$-LiF (1:6) | 1000 | 40 | 500 |
| $AlF_3$-LiF:$CaF_2$ (1:2:2) | 966 | 42 | 500 |
| $YbF_3$-LiF (1:4) | 1080 | 42 | 500 |
| $AlF_3$-LiF-$CaF_2$ (1:1:3) | 1015 | 60 | 510 |
| $AlF_3$-LiF $CaF_2$ (1:3:1) | 1002 | 58.5 | 501 |
| $AlF_3$-LiF $CaF_2$ (1:3:3) | 1006 | 30 | 500 |
| $ZrF_4$-LiF-$CaF_2$ (1:2:2) | 1006 | 30 | 500 |
| $AlF_3$-LiF-$CaF_2$ (1:5:1) | 1151 | 58.5 | 501 |
| $AlF_3$-LiF $CaF_2$ (1:3:3) | 1001 | 36 | 1000 |
| $AlF_3$-LiF $CaF_2$ (1:3:3) | 1001 | 40 | 500 |
| $AlF_3$-LiF $CaF_2$ (.75:3:3) | 1001 | 40 | 500 |
| $AlF_3$-LiF $CaF_2$ (1:5:3) | 1008 | 50 | 500 |
| $AlF_3$-LiF $CaF_2$ (1:5:1) | 1002 | 50 | 500 |
| $ZrF_4$-LiF-$CaF_2$ (1:5:1) | 1038 | 50 | 501 |
| $HfF_4$-LiF-$CaF_2$ (1:2:2) | 835 | 50 | 501 |
| $HfF_4$-LiF-$CaF_2$ (1:3:3) | 610 | 7 | 500 |
| $B_2O_3$-LiF-$CaF_2$ (1:5:1) | 1010 | 50 | 501 |
| $ZrF_4$-LiF-$BaF_2$ (1:3:3) | 1010 | 50 | 500 |
| $ZrF_4$-LiF-$BaF_2$ (1:5:1) | 1010 | 50 | 501 |

All compositions contained a percentage (%) of a glass former. In this example a range of fluoride glass formers were utilized including $AlF_3$, $ZrF_4$, $GaF_3$, $HfF_4$, $YbF_3$. Although these glass formers were utilized, other known fluoride glass formers can be utilized, including, but not limited to $ThF_3$, $InF_3$, $ZbF_2$, $UF_3$, $YF_3$ etc. A glass former with a high electrolytic stability and ability to form electronically insulating glasses can be utilized, as well as those glass formers that would contribute to the fluoride anion conductivity.

The glass formers were combined with glass modifiers, which are also F conductors. These include LiF, $CaF_2$, $BaF_2$, and $LaF_3$. Other modifiers which exhibit considerable F conduction can be utilized such as $BiF_3$, $PbF_2$, $SnF_2$, $SnF_4$.

Finally LiF was added as a Li source for electrochemically formed batteries of this invention that rely on Lithium and fluoride diffusion.

Forming a material composition of the aforementioned materials most ideally would result in a dual ion conducting system exhibiting at least fast $Li^+$ and F ionic conductivity.

The represented compositions were mixed well with a mortar and pestle and deposited as thin films onto an interdigitated current collector structure through the use of thermal evaporation.

Sensitivity to current collector material selection is needed as such current collectors can combine with the mobile species to result in an electrochemically formed electrode (i.e. reactive current collectors). For example, the positive current collector most ideally would form a very high energy density electrode with the $F^-$ ion. Therefore the reactive current collector should be of a material composition to do so. Positive current collectors of silver, bismuth, lead, tin, gold, iron, nickel, palladium, copper, carbon (carbon nanotubes, graphene, graphite) all can be considered viable current collector materials that will anodically form representative metal or carbon fluorides with the mobile F—ion and a subsequent positive electrode of exceptionally high energy density. Such current collectors can be formed as a mixed alloy, as composites, or as compositionally graded structures to facilitate the charge transport of the ions and electrons to easily form the desired metal fluoride. For example, a small amount of bismuth, lead, or lanthanum, can be added to form bismuth fluoride based compounds within a matrix of silver to enable fast diffusion of fluoride ion deep within the structure. In addition, to aid in the transfer of electrons to the external circuit of the battery, the positive current collector can contain (in the form of a micron or nanoscaled composite) an electronically percolating network of a metal that does not react with F− in appreciable amounts. For example, gold, platinum, or non reactive carbons may be added to guarantee fast electron transfer between the active material and the external structure of the battery.

The negative current collector can be a non reactive metal, such as Ti, Ni, Cu, Mo, Ca, La, Y, Li, glassy carbon, or can be reactive, such that it can form alloys with the electrodeposited Ag, In, Al, Si, Sn, Ge, Mg, Au, Pd, Bi, Pb, graphene, etc., or a mixture of any of the above, or can result in the formation of an intercalation compound in the case of carbon such as graphite electrodes and carbon nanotubes. In addition, the alloying metal can be contained with the initial bi-ion conducting fluoride composition. For example, during formation, Al from $AlF_3$ could deposit near the negative current collector, and then subsequently alloy with the electrochemically reduced Li to form a $Li_xAl$ alloy. Reactive current collector structures can be of interdigitated or opposing planar designs. Alternatively such structures may be of three dimensional incorporation within the amorphous chemistry. In order to facilitate intimate and high surface interface with the self forming fluoride chemistry, it would be advantageous to have the current collector of a micro or nano morphology such that interpenetrating contact between the metal current collector and the bi-ion conducting fluoride chemistry can occur (see FIGS. 1A and 1C). Therefore the current collector structures could be columnar or structured in other morphologies to afford such intimate contact. Such structures may be on the order of microns or nanometers.

Figure 1B:
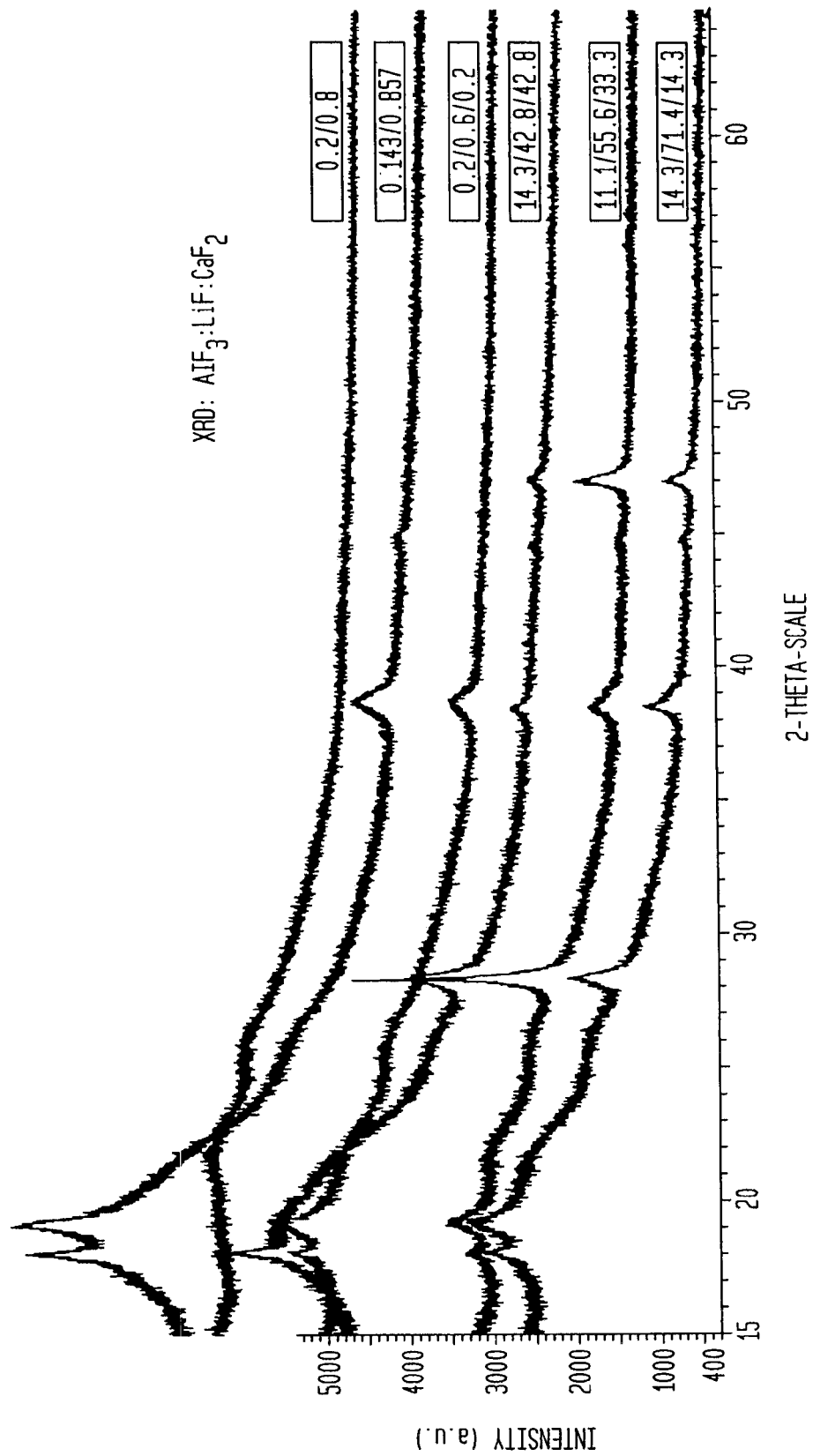
FIG. 1B shows XRD profiles of $AlF_3$/LiF/$CaF_2$ compositions fabricated utilizing a LiF lithium conductor and various fluoride conducting glass network modifiers.
Figure 1C:
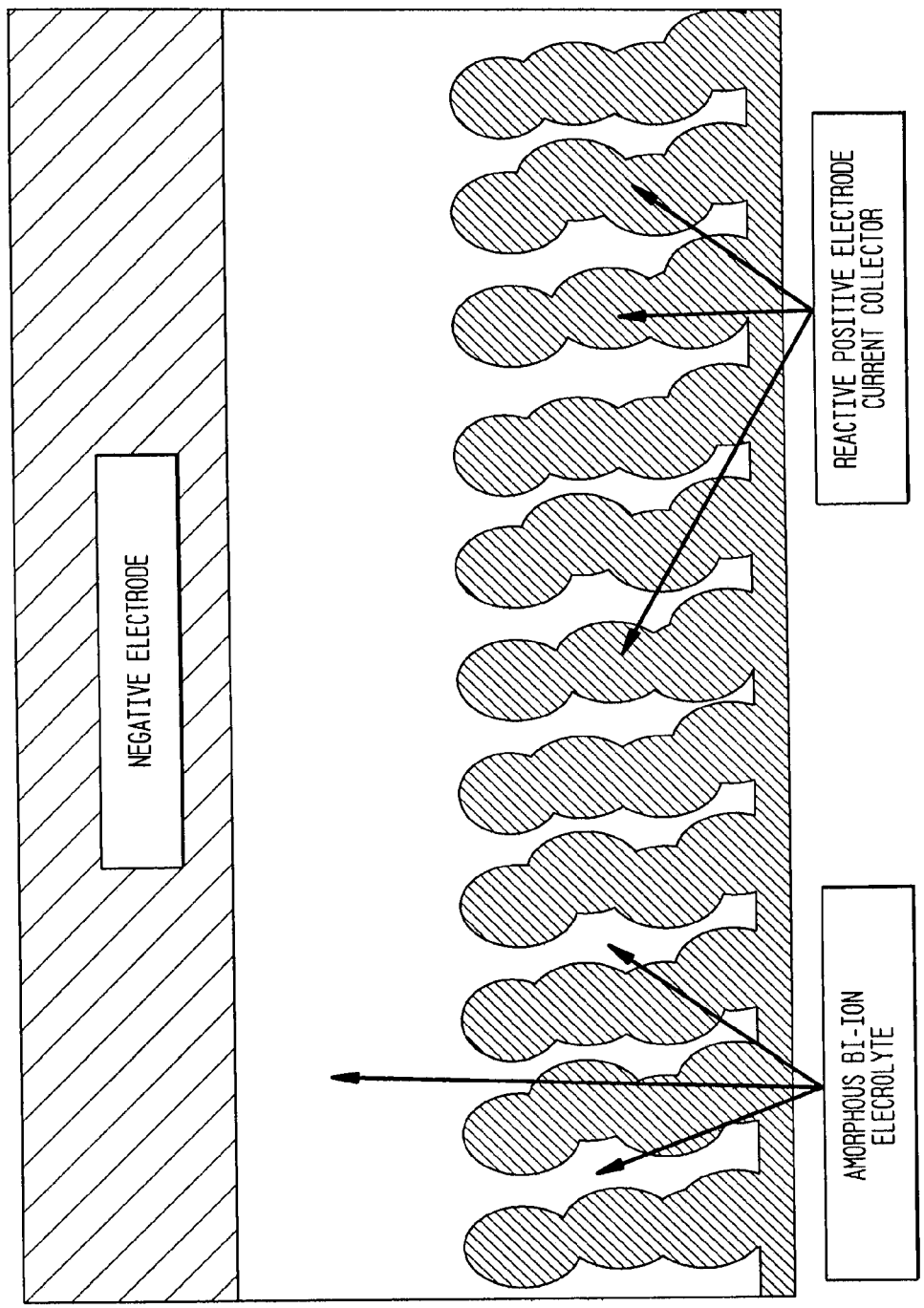
FIG. 1C shows a schematic representation of the one embodiment of the described invention that utilizes interpenetrating 3-D reactive positive current collectors.

For most of the examples demonstrated herein, the current collectors were fabricated of 500 nm Ag in an interdigitated design (see, for example, Table 1 (column 4) and FIGS. 1A and 1C).

Although thermal evaporation was utilized to deposit the amorphous fluoride compositions, other physical vapor deposition methods, such as electron beam evaporation, sputtering techniques, plasma deposition, and chemical vapor deposition techniques can be utilized to fabricate the films. In addition, low cost techniques which can extend the concept beyond thin film to structures of 10s to 100s of microns of thickness can be utilized, such as sol gel chemistry with spin or dip coating, arc melting and quenching, and even traditional melt—quench or melt-cast processes that have been utilized by those familiar with the state of the art in glass manufacturing.

All the electrochemical tests below were fabricated by thermal evaporation of the reactive current collectors in an interdigitated array (IDA) pattern with digit width of approximately 250 micron with a spacing of approximately 250 micron in a 8 mm×14 mm overall structure, as shown in FIG. 1A, with a thickness of approximately 1 micron. FIG. 1C shows a schematic representation of the one embodiment of the described invention that utilizes interpenetrating 3-D reactive positive current collectors. The amorphous compositions were deposited on top of the interdigitated array at a thickness of approximately 1 micron. All electrochemical tests were performed inside an argon filled glovebox to eliminate impact of ambient atmosphere. It is understood by those familiar with the art of nonaqueous battery technologies that quasi hermetic encapsulation can be applied to enable performance of the battery in an ambient environment.

Example 2

Glass Compositions Consisting of $AlF_3$ Glass Former

Figure 2A:
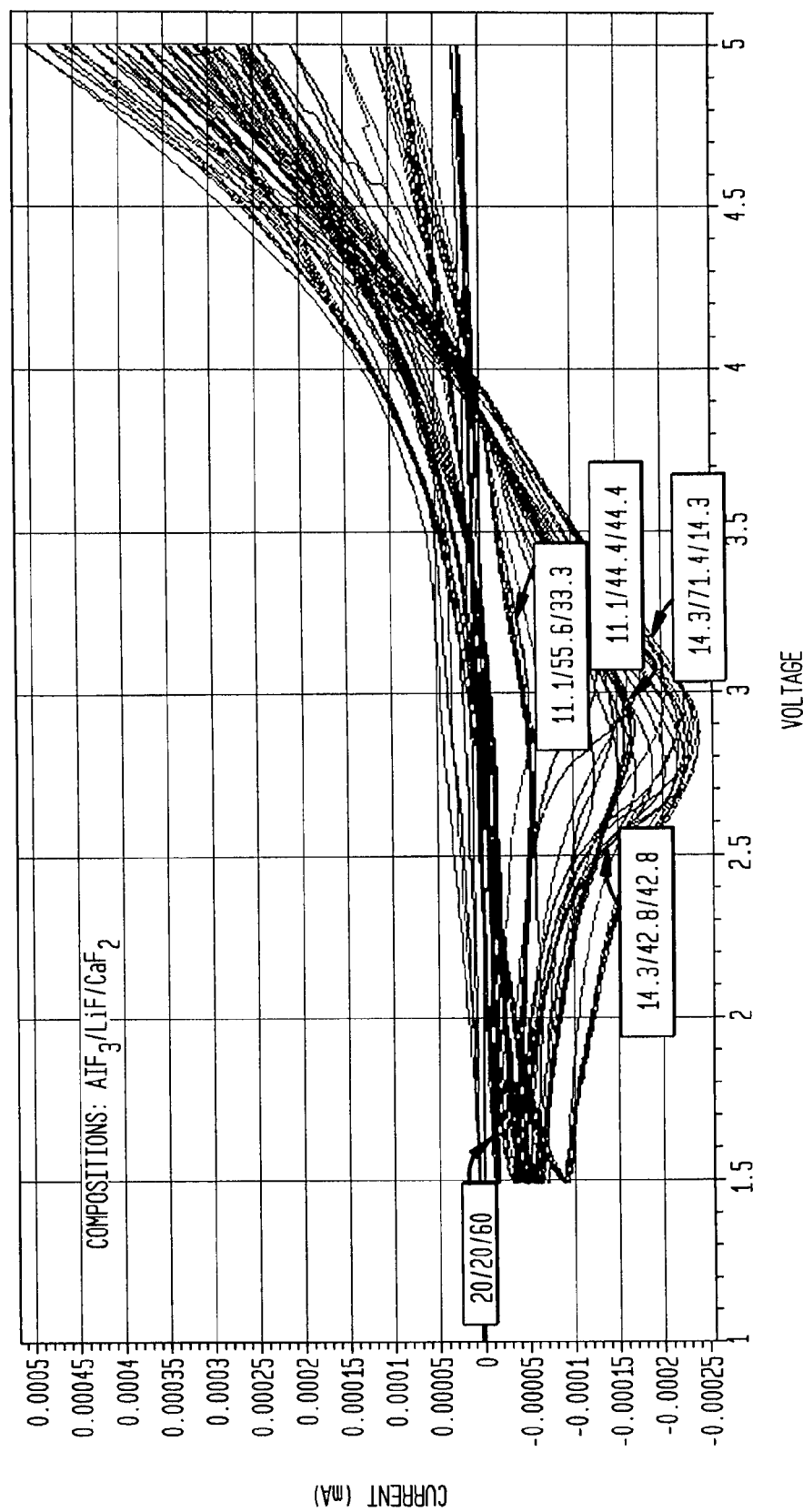
FIG. 2A shows a plot of current (mA) versus voltage of the amorphous compositions $AlF_3$/LiF/$CaF_2$.
Figure 3:
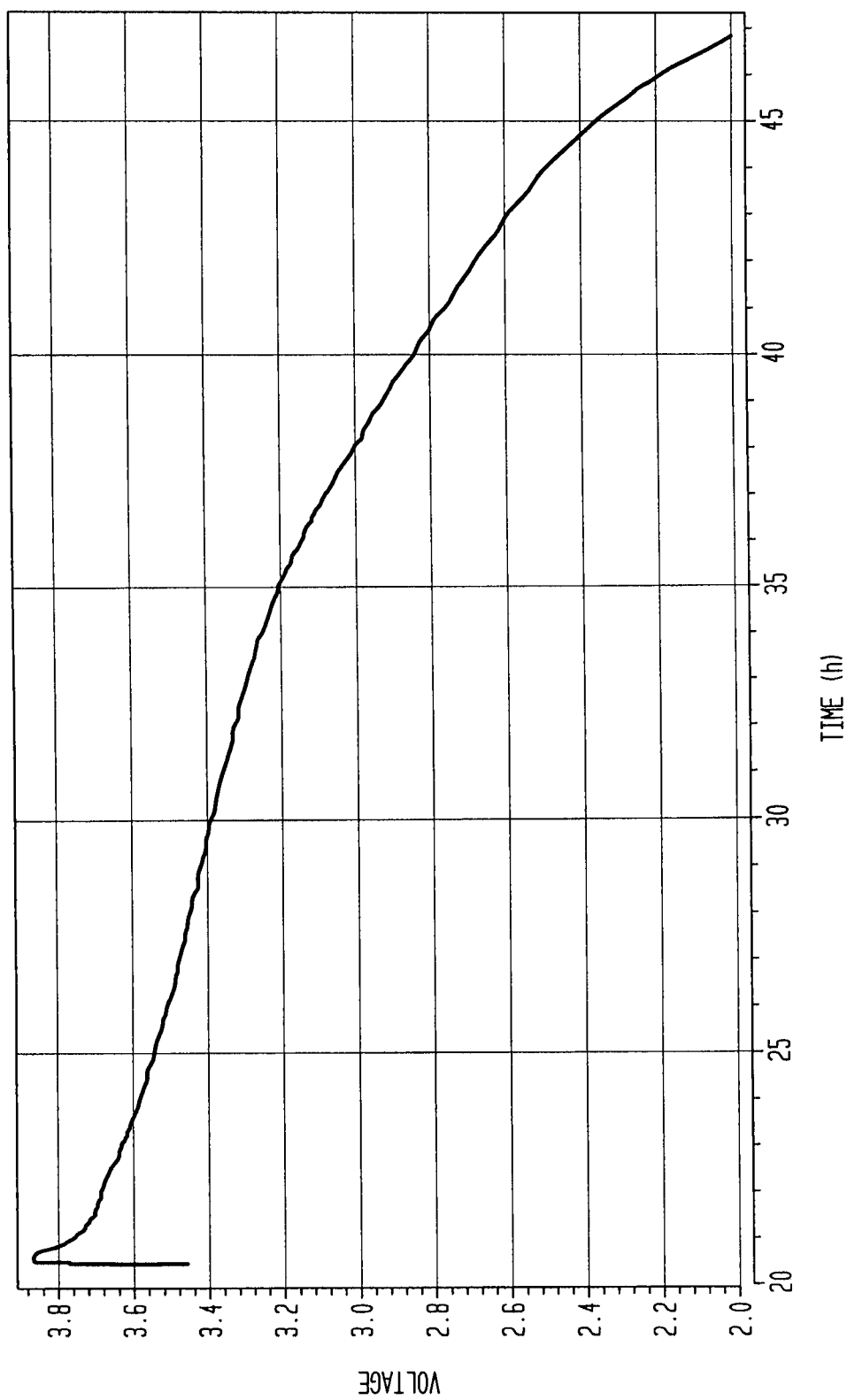
FIG. 3 shows a plot of voltage versus time representative of a discharge profile for a cell that has been charged at 5V constant current.

As per Table 1, various compositions containing $AlF_3$ as the glass former were investigated for their physical and electrochemical properties. FIG. 1B shows plots of intensity (a.u.) versus degrees (2-theta) representing the XRD profiles of $AlF_3$/LiF/$CaF_2$ compositions fabricated utilizing a LiF lithium conductor and various fluoride conducting glass network modifiers. As can be seen, all samples are very amorphous with a slight Bragg reflection with 2θ values between 47 and 48 degrees related to a nanophase of $CaF_2$ for $CaF_2$ rich compositions. FIG. 2A shows a plot of current (mA) versus cell voltage of the amorphous compositions $AlF_3$/LiF/$CaF_2$ illustrating potentiodynamic sweeps of the amorphous compositions. As can be seen in FIG. 2A, the first charge evolves considerable anodic current relating to the formation of the battery. The subsequent discharge shows significant cathodic current in the voltage region of 2-4V. This is consistent with a formed Li—Ag alloy/solid state electrolyte/$AgF_x$ based battery. Subsequent cycles show that the cycling stability of the compositions is excellent. An increasing electrochemical utility is seen for the compositions containing greater amounts of LiF. FIG. 3 shows a plot of voltage versus time representative of a discharge profile for one such cell that has been charged at 5V constant current. As can be seen, considerable capacity is evolved from the battery at useful voltages.

Example 3

Glass Compositions of $ZrF_4$ Glass Former

Figure 4:
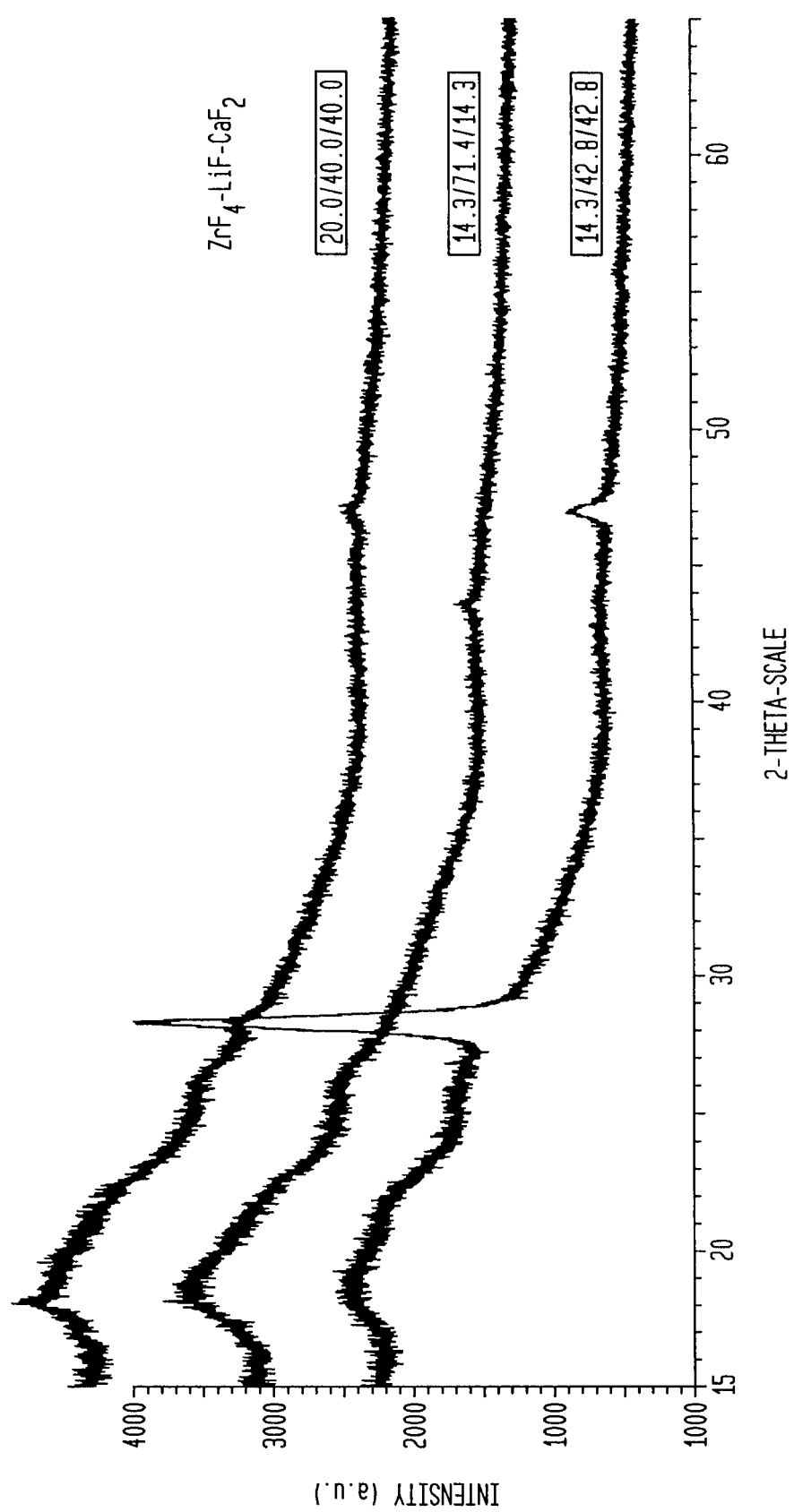
FIG. 4 shows XRD profiles of $ZrF_4$/LiF/$CaF_2$ compositions fabricated utilizing a LiF lithium conductor and various fluoride conducting glass network modifiers.
Figure 5:
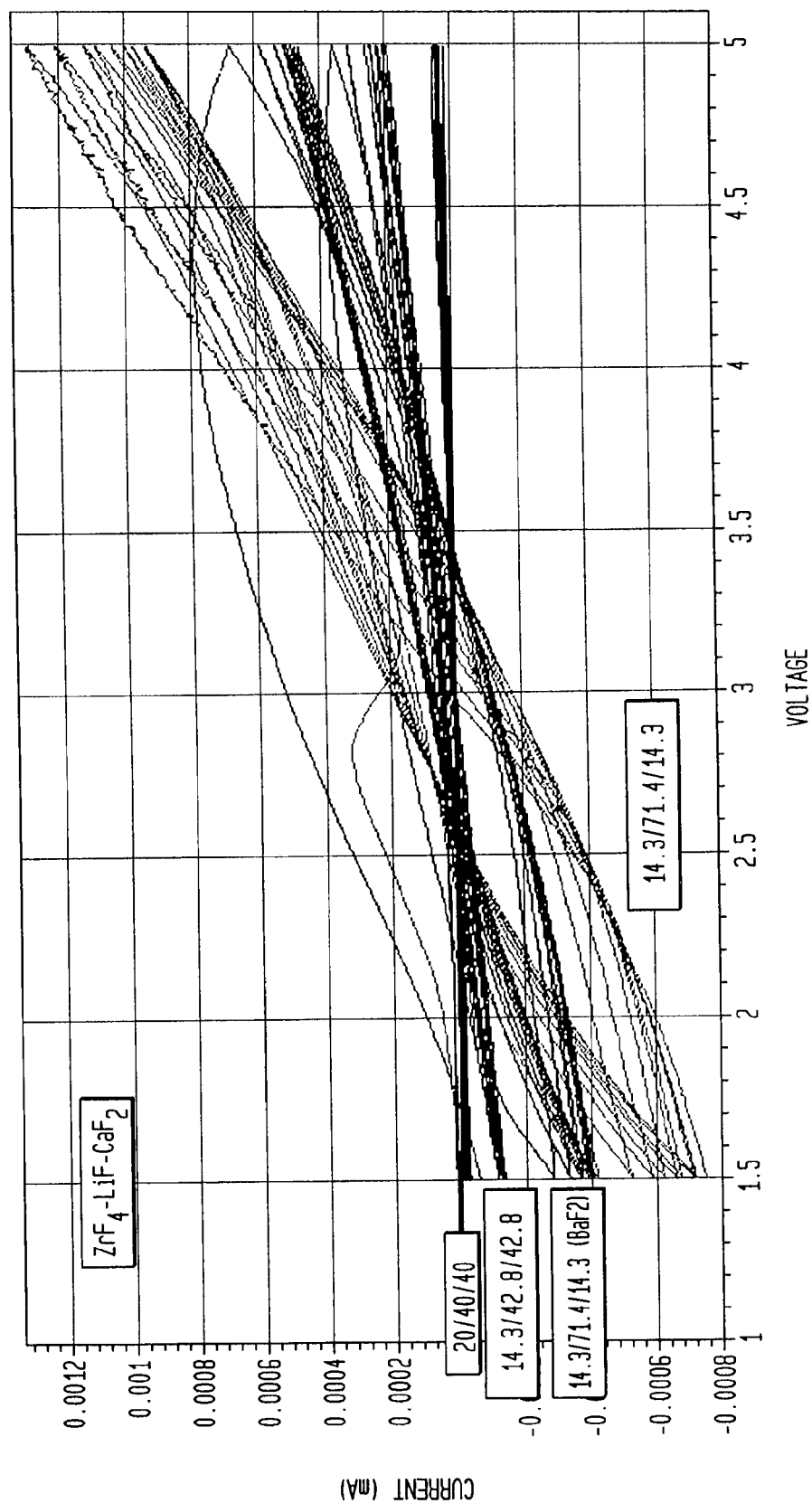
FIG. 5 shows a plot of current (mA) versus voltage comparing the potentiodynamic response of the amorphous compositions $ZrF_4$/LiF/$CaF_2$, and one including $BaF_2$ as a substitute for $CaF_2$.

As per Table 1, various compositions containing $ZrF_4$ as the glass former were investigated for their physical and electrochemical properties after being deposited on top of reactive current collectors for both the positive and negative electrodes. FIG. 4 shows plots of intensity (a.u.) versus degrees (2-theta) representing XRD profiles of ZrF4/LiF/CaF2 compositions fabricated utilizing a LiF lithium conductor and various fluoride conducting glass network modifiers. As can be seen, all samples are very amorphous with only a slight Bragg reflection with 2θ values between 46 and 48 degrees related to a nanophase of $CaF_2$ for the sample with the greatest quantity of $CaF_2$ in the composition. FIG. 5 shows a plot of current (mA) versus voltage comparing the potentiodynamic response of the amorphous compositions $ZrF_4/LiF/CaF_2$, and one including $BaF_2$ as a substitute for $CaF_2$. As can be seen in FIG. 5, the first charge evolves considerable anodic current relating to the formation of the battery. The subsequent discharge shows significant cathodic current in the voltage region of 2-4V. This is consistent with a formed Li—Ag alloy/solid state electrolyte/$AgF_x$ based battery. As with the $AlF_3$ study of Example 2, those compositions with highest LiF content exhibited the greatest electrochemical utility. The potentiodynamic sweeps of FIG. 5 also show that the $BaF_2$ modified fluoride composition demonstrated considerable electrochemical utility. Subsequent cycles shows that the cycling stability of the compositions is excellent.

Figure 6:
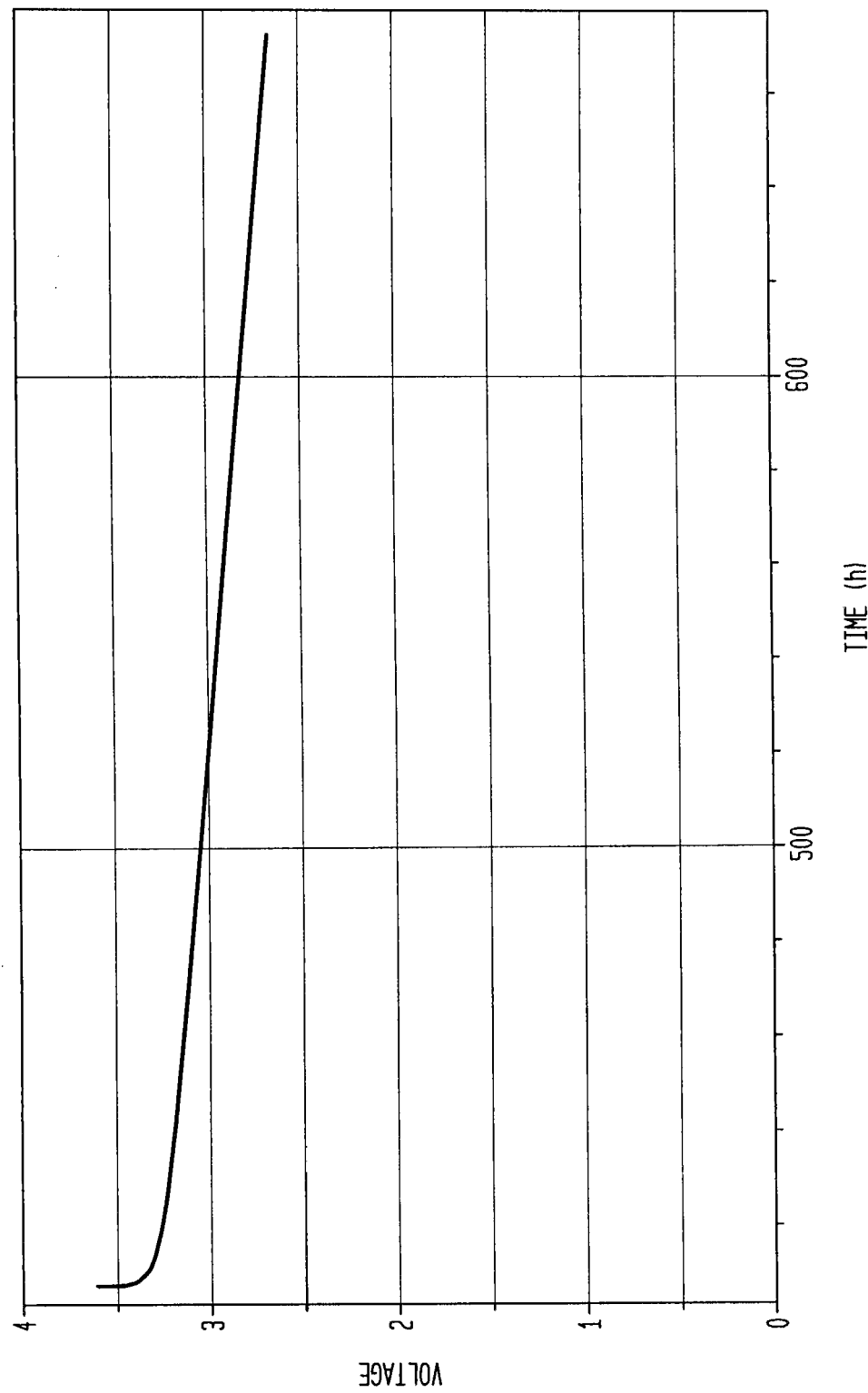
FIG. 6 shows a plot of voltage versus time (hour) illustrating a representative discharge profile for a cell that has been charged at 5V constant current.

FIG. 6 shows a plot of voltage versus time (hour) illustrating a representative discharge profile for such a cell that has been charged at 5V constant voltage then discharged at a constant current of 10 nA. Considerable capacity is evolved from the battery at useful voltages.

Example 4

Comparison of Various Glass Formers

Figure 7:
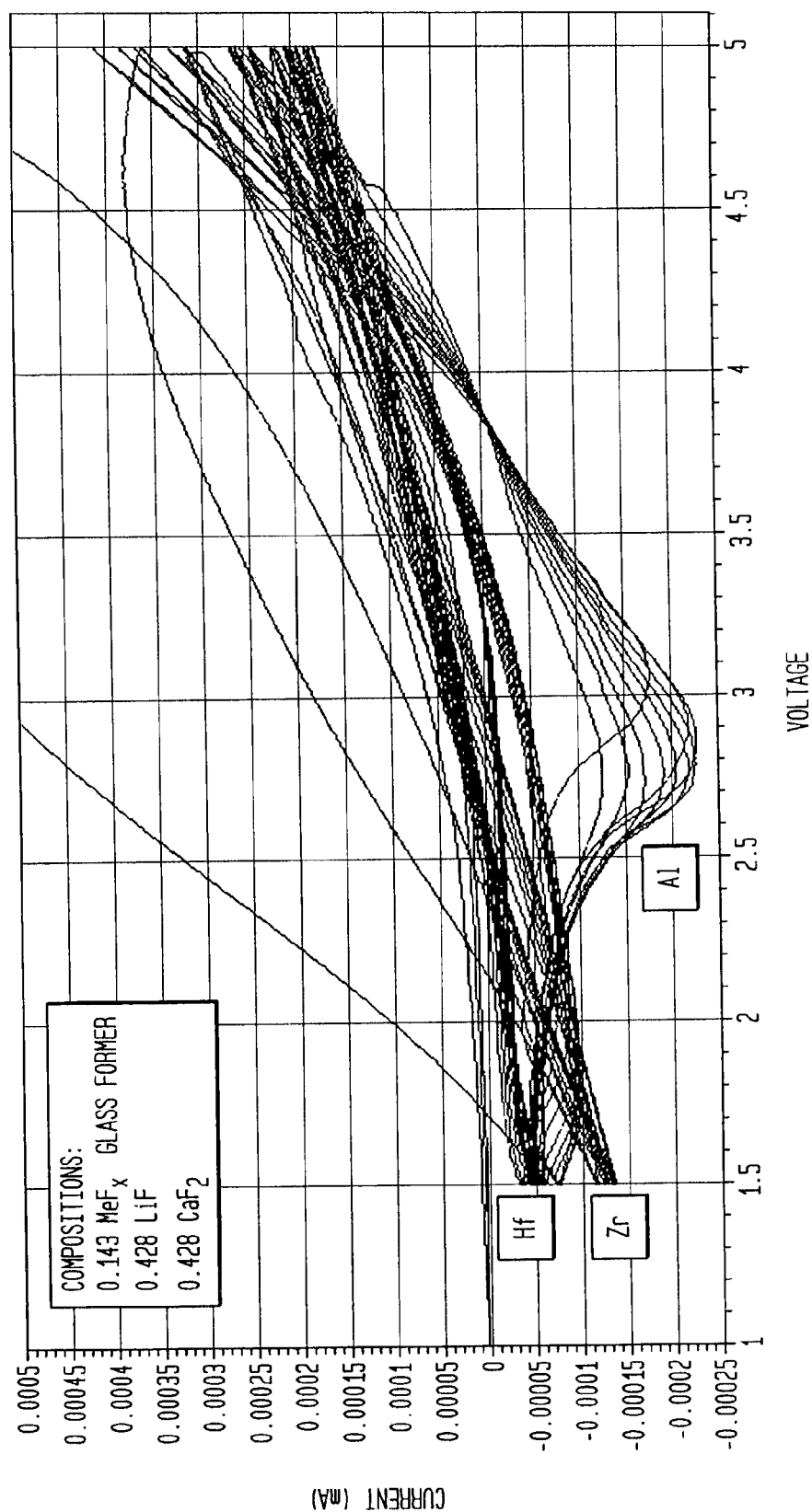
FIG. 7 shows a plot of current (mA) versus cell voltage illustrating a comparison of the potentiodynamic response of compositions of 0.143 $MeF_x$-0.428LiF-0.428$CaF_2$ where Me=Al, Hf, and Zr.
Figure 8:
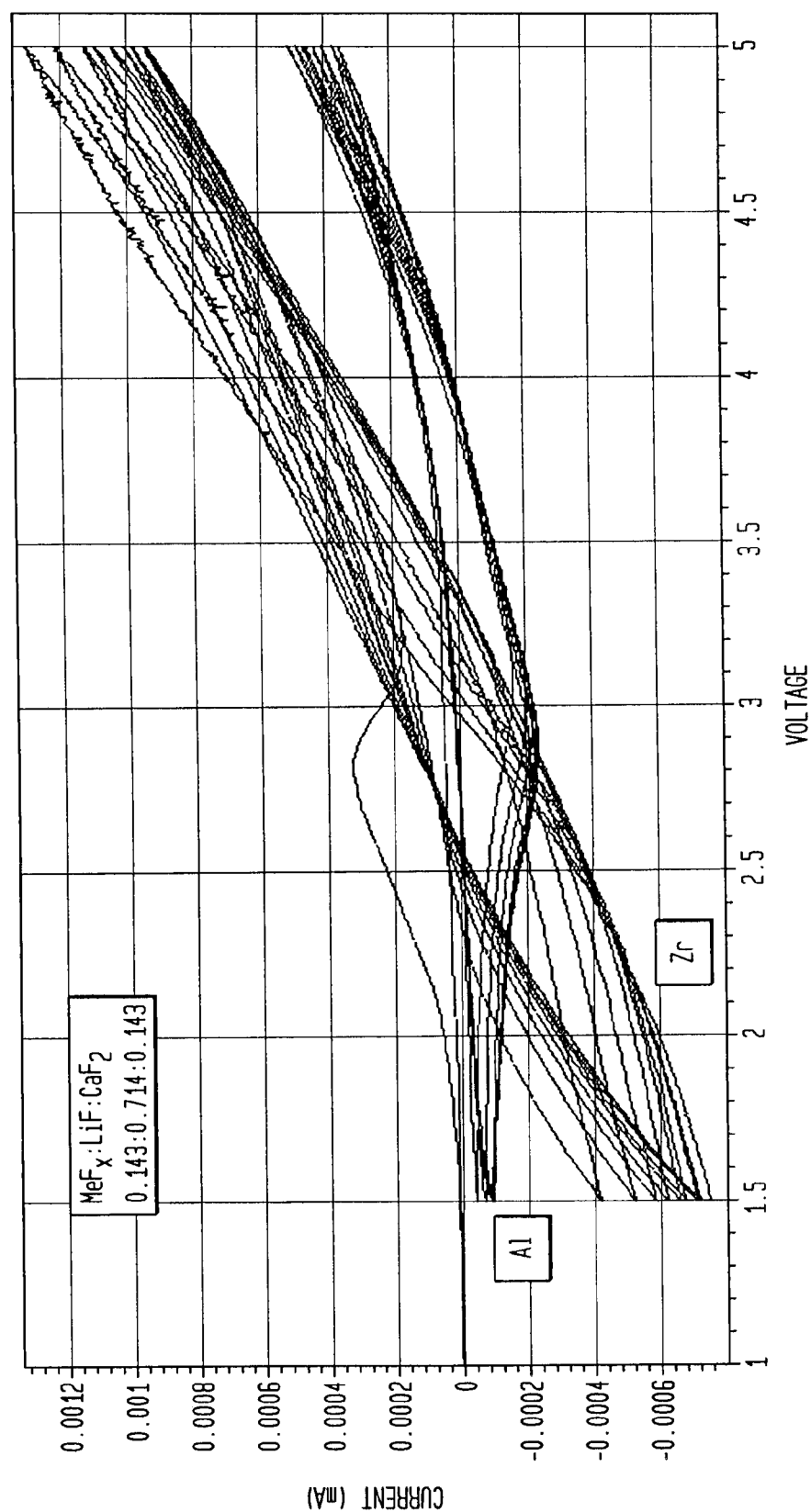
FIG. 8 shows a plot of current (mA) versus cell voltage illustrating a comparison of the potentiodynamic response of compositions of 0.143 $MeF_x$-0.714LiF-0.143$CaF_2$ where Me=Al, Hf, and Zr.

FIG. 7 shows a plot of current (mA) versus cell voltage illustrating a comparison of the potentiodynamic response of compositions of 0.143 $MeF_x$-0.428LiF-0.428$CaF_2$ where Me=Al, Hf, and Zr. All three compositions resulted in an amorphous film. All three films resulted in appreciable electrochemical activity and good reversibility after being deposited on top of reactive current collectors for both the positive and negative electrodes. FIG. 8 shows a plot of current (mA) versus cell voltage illustrating a comparison of the potentiodynamic response of compositions of 0.143 $MeF_x$-0.714 LiF-0.143 $CaF_2$ where Me=Al, Hf, and Zr. The best electrochemical utility for the three examples was observed for the compositions utilizing the $AlF_3$ glass former. However if the LiF composition is raised to 0.143 $MeF_x$-0.714 LiF-0.143 $CaF_2$, FIG. 8 shows that the best electrochemical utility is observed for the $ZrF_4$ glass former.

Without being bound by theory, it is believed that $ZrF_4$ compositions gave the best performance because such compositions exhibit the fastest dual ion conductivity in the form of $Li^+$ and $F^-$. Without being bound by theory, it is believed that compositions which exhibit faster conductivities will give even more improved performance as long as the compositions are stable towards the electrochemical decomposition of the network former. Such compositions may extend to the fluoroborates and fluorophoshates as these compositions should exhibit good electrochemical stability.

Figure 2B:
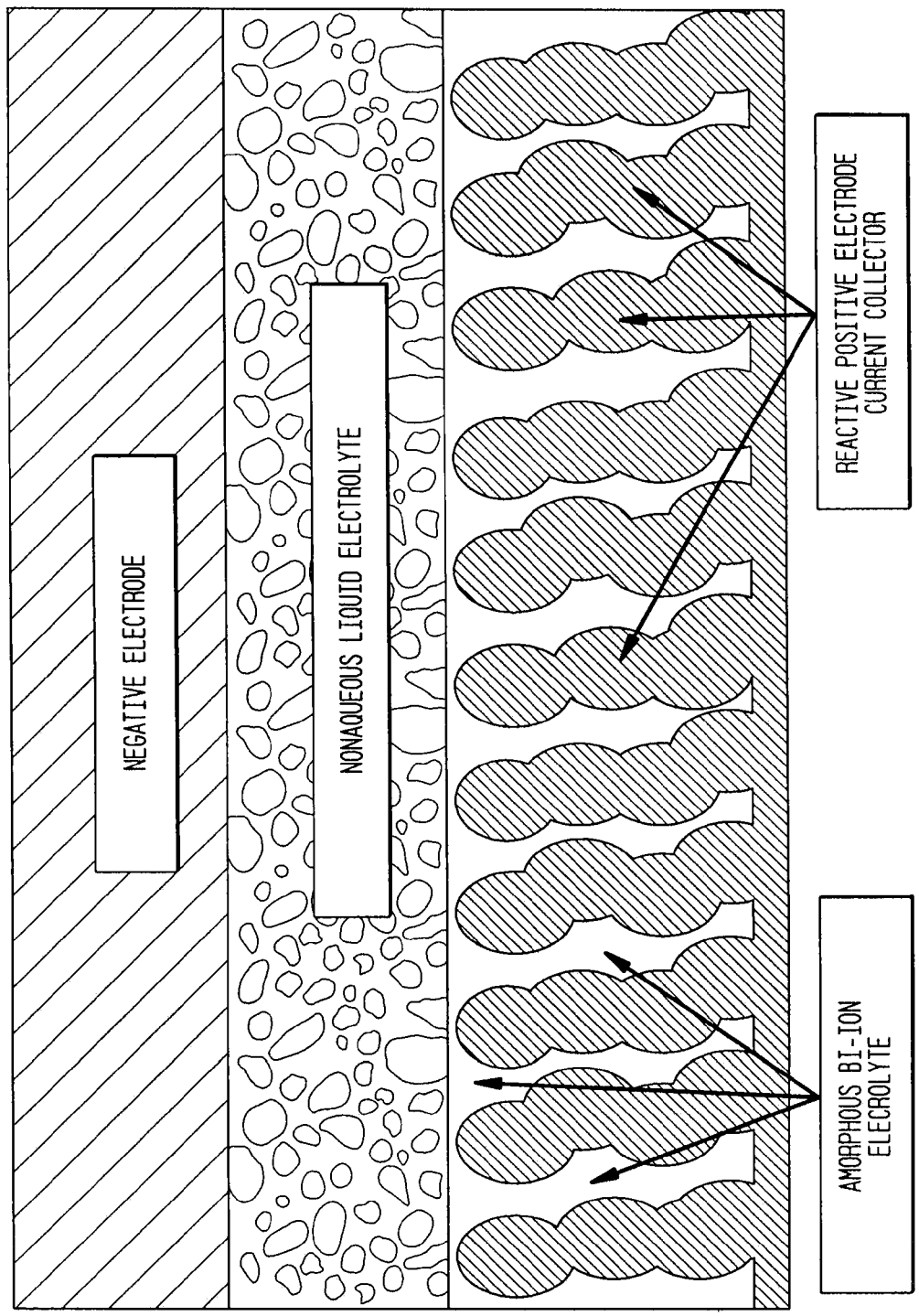
FIG. 2B shows a schematic representation of one embodiment of the described invention utilizing a bi-ion conducting amorphous coated reactive positive electrode and the incorporation of a non aqueous Li+ conducting electrolyte.

Bi-ion conducting compositions unstable to the applied electrochemical potential also can be utilized. Within such a concept, the glass former or modifier can be oxidized or reduced to become part of the positive or negative electrode, respectively. For example, $AlF_3$ glass former may reduce at the negative electrode to form Al, which will then act as an alloying agent for lithium upon full cell formation. In such applications, it may be preferable to have a gradient in compositions of the amorphous fluoride between the positive to the negative electrode. FIG. 2B shows a schematic representation of one embodiment of the described invention utilizing a bi-ion conducting amorphous coated reactive positive electrode and the incorporation of a non aqueous Li+ conducting electrolyte. In this embodiment, a nonaqueous liquid electrolyte is placed between the negative reactive current collector and the amorphous bi-ion conducting electrolyte coated positive reactive current collector (see FIG. 2B). Additionally, a nonaqueous liquid electrolyte is placed between the positive reactive current collector and the amorphous bi-ion electrolyte coated negative reactive current collector. Nonaqueous electrolytes include, but not are not limited to, a selection of lithium salts such as $LiPF_6$, $LiBF_4$, $LiClO_4$, LiF in various organic solvents including cyclic (propylene carbonate, ethylene carbonate) and acyclic (diethyl carbonate, dimethyl carbonate) carbonates, ethers, boranes (tris(pentafluorophenyl) borane) and nitriles (acetonitrile, methoxypropylnitrile, adiponitrile). Further, fluoride compositions exhibiting the dual ion conductivity requirement for such a self formed cell also can be in the form of molten fluoride salts (ionic liquids).

Example 5

Example of Binary LiF Containing Compositions

Figure 9:
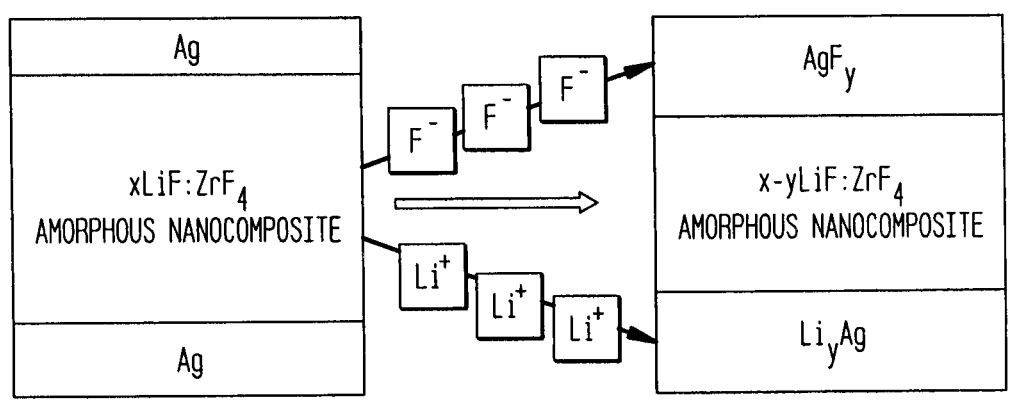
FIG. 9 shows a schematic representative of the electrochemically formed cell.

FIG. 9 shows a schematic representative of one embodiment of the electrochemically formed cell. A binary composition of $LiF:ZrF_4$ is placed between two silver reactive current collectors. The cell then is electrically polarized to induce the $Li^+$ ion diffusion towards the negative reactive current collector, at which the $Li^+$ ion reduces to form a $Li_xAg$ alloy. In a parallel reaction, the F—ion diffuses towards the positive electrode to form silver fluorides through an oxidation reaction. Afterwards, the cell can be discharged to reestablish the starting components.

Figure 10:
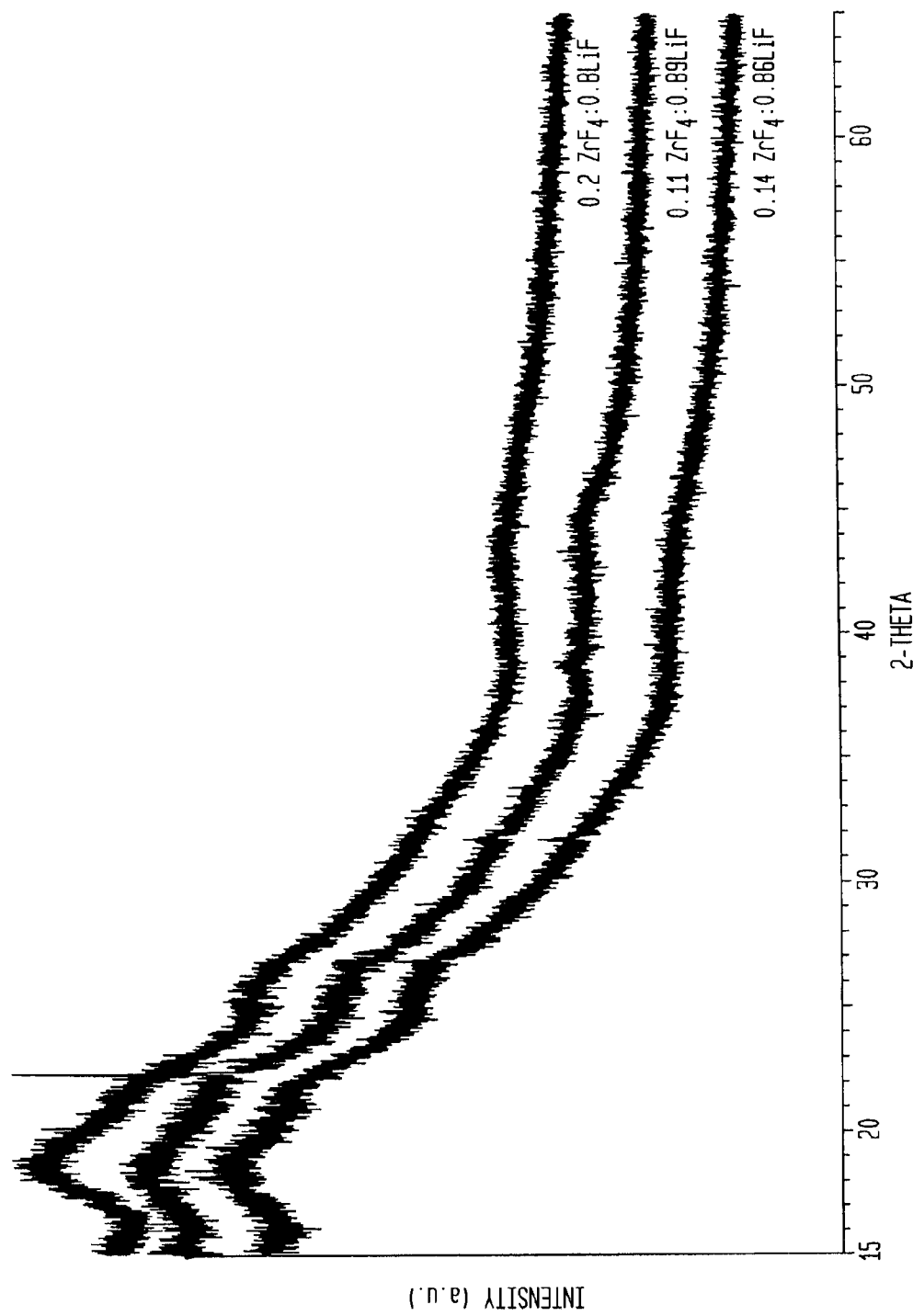
FIG. 10 shows XRD profiles of deposited $xZrF_4$:(1-x)LiF films where x=0.11, 0.14, and 0.2.
Figure 11:
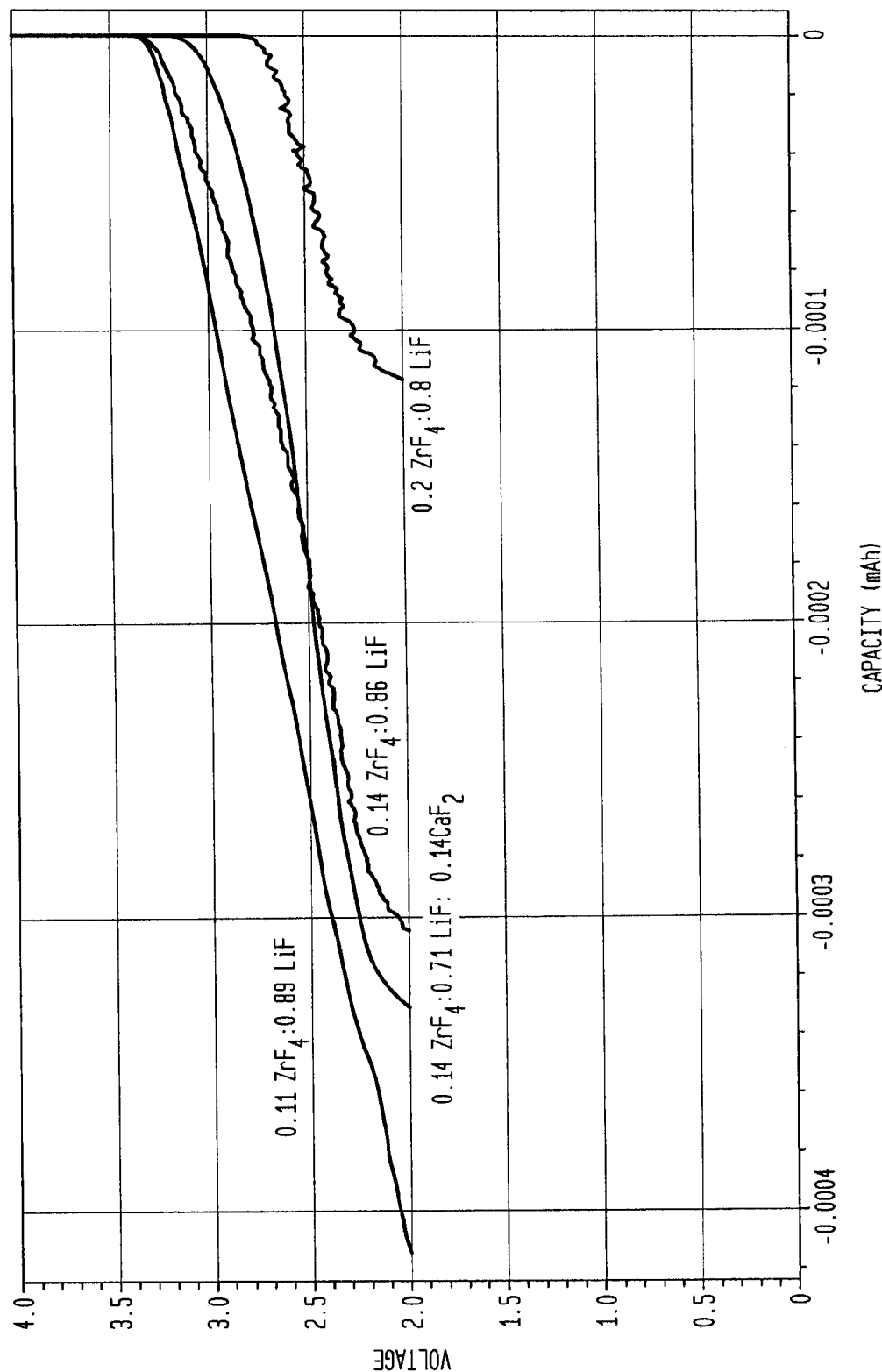
FIG. 11 shows a plot of voltage versus capacity (mAh) representing the 10 nA discharge of the binary compositions ($ZrF_4$:LiF) after being charged for a very short 1 hour period at 5V.

FIG. 10 shows a plot of intensity (a.u.) versus 2-theta representing the XRD patterns of deposited $xZrF_4:(1-x)LiF$ films where x=0.11, 0.14, and 0.2. Even though a very small amount of $ZrF_4$ glass former is present, the films deposit as amorphous compositions. FIG. 11 shows a plot of cell voltage versus capacity (mAh) representing the 10 nA discharge of the binary compositions ($ZrF_4:LiF$) after being charged for a very short 1 hour period at 5V. It can be seen from the discharge profiles in FIG. 11 that the samples with the greatest amount of LiF had the highest electrochemical activity.

For the examples below, unless otherwise noted, the typical charge/formation protocol of the in-situ formed cell was 200 nA to 4.75V followed by a constant voltage hold at 4.75V until the current decayed to approximately 10 nA. This is followed by a discharge of various currents using 10 nA as the minimum current. All examples below utilize an amorphous bi-ion conductor composition consisting of 90 LiF 10 $ZrF_4$, which was deposited as a 1 micron film on top of the following interdigitated arrays. All cell structures were of the aforementioned interdigitated cell as represented by the schematic illustration of FIGS. 1A and 1C. Unless otherwise indicated, the negative digit was Bi metal of approximate thickness of 500 nm. The same thickness was utilized for the positive electrode.

Example 6

Example of Positive Electrode Metallization Composites: Bi+Ca

The Bi—Ca alloy positive reactive current collector was deposited in various ratios as depicted in Table 2 below:

TABLE 2

| Alloy | µAh Charge @ 200n A | µAh Discharge |
|---|---|---|
| 0Ca:1Bi (0:100) | 0.2 | 4 |
| 1Ca:8Bi (12.5:87.5) | 8 | x |
| 1.5Ca:8Bi (18.8:81.2) | 12 | 11 |
| 1Ca:3Bi (25:75) | 24 | 26 |

Figure 12:
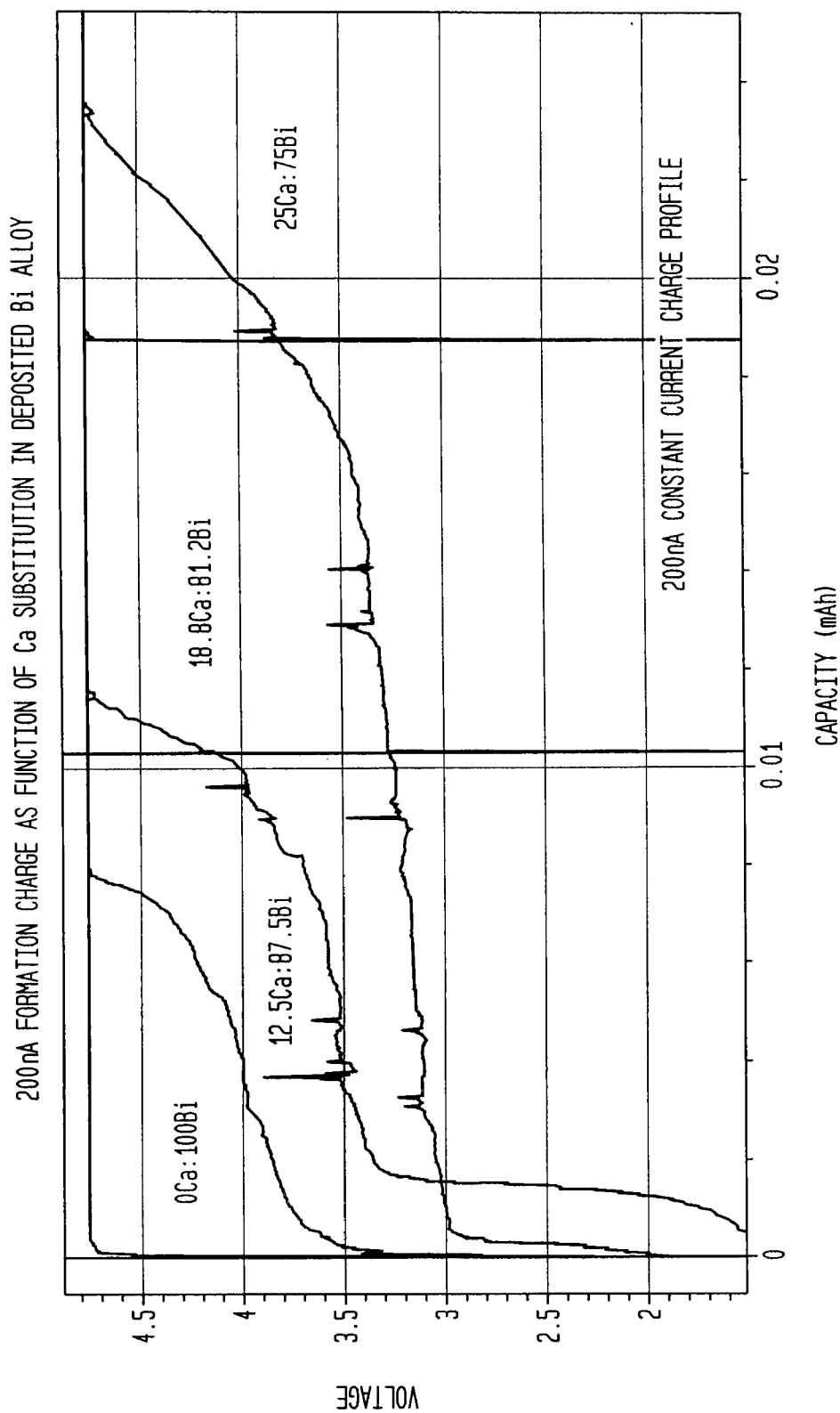
FIG. 12 shows a plot of voltage versus capacity representing 200 nA formation charge as a function of Ca substitution in deposited Bi alloy.

FIG. 12 shows a plot of voltage versus capacity (mAh) representing 200 nA formation charge as a function of Ca substitution in deposited Bi alloy; the Bi—Ca alloy positive reactive current collector was deposited in various ratios as depicted in Table 2. The data show that significant improvement in the constant current voltage profile and resulting formation capacity and the following discharge capacity can be realized with proper amounts of Ca additions. This shows that the use of a heterogeneous reactive current collector can be advantageous. While not being bound by theory, the in situ formed electrode may be a calcium substituted bismuth fluoride, which would have improved F- diffusion.

Example 7

Example of Positive Electrode Metallization Composites: Bi+Ag

The Bi—Ag alloy positive reactive current collector was deposited in various ratios as depicted in Table 3.

TABLE 3

| Alloy | µAh @ 200 nA Charge | µAh Discharge |
|---|---|---|
| 0Ag:1Bi (0Ag:100Bi) | 0.2 | 4 |
| 1Ag:8Bi (12.5:87.5Bi) | 17.5 | 30 |
| 1Ag:3Bi (25Ag:75Bi) | 22 | 4 |
| 1Ag:1Bi (50Ag:50Bi) | 7 | 3 |
| 3Ag:1Bi (75Ag:25Bi) | 1 | 1 |

Figure 13:
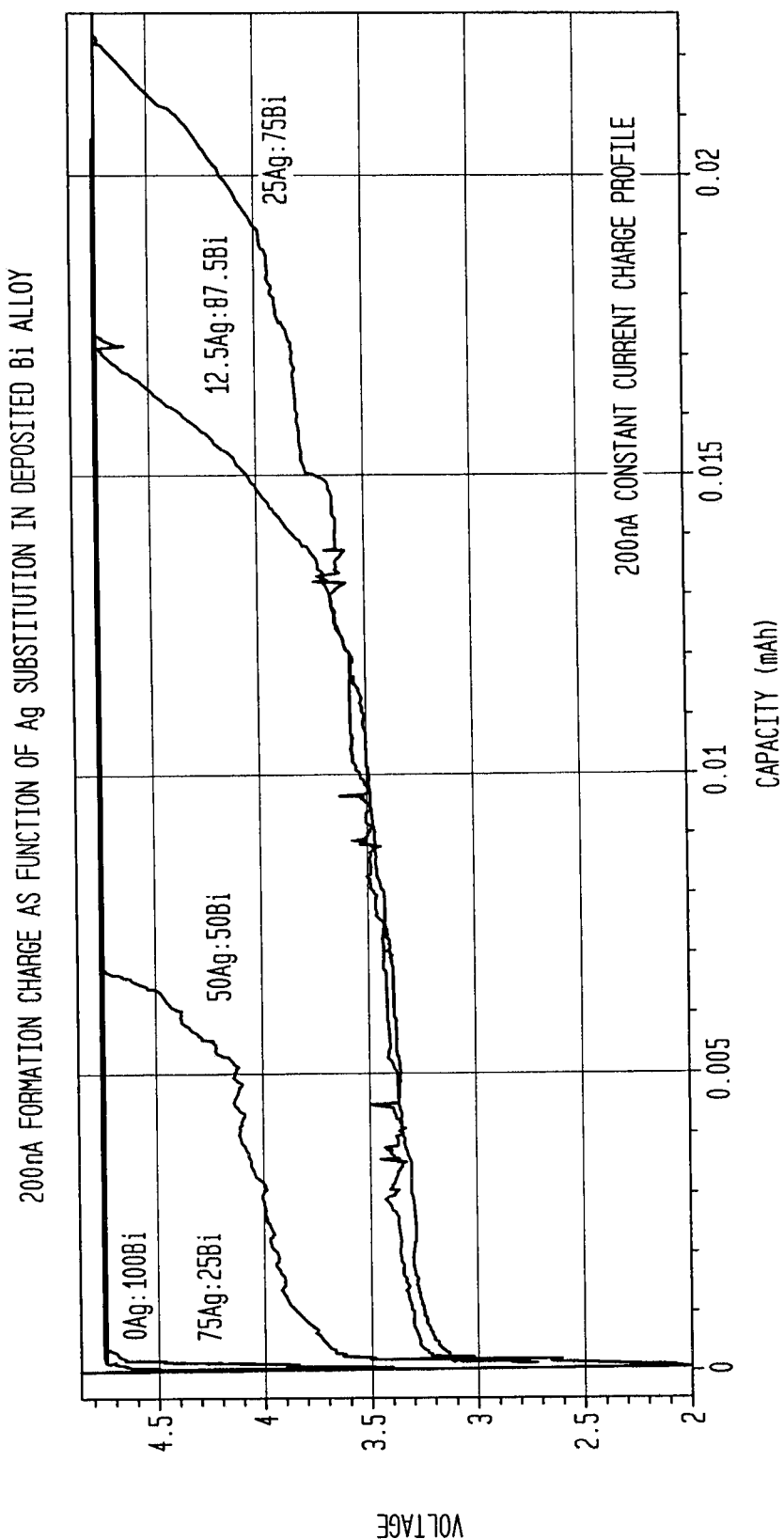
FIG. 13 shows a plot of voltage versus capacity (mAh) representing 200 nA formation charge as a function of Ag substitution in deposited Bi alloy.

FIG. 13 shows a plot of voltage versus capacity (mAh) representing 200 nA formation charge as a function of Ag substitution in deposited Bi alloy; the Bi—Ag alloy positive reactive current collector was deposited in various ratios as depicted in Table 3. The data show that significant improvement in the constant current voltage profile, resulting formation capacity, and the following discharge capacity can be realized with proper amounts of Ag additions. This shows that the use of a heterogeneous reactive current collector can be advantageous. Without being bound by theory, the in situ formed electrode may result in a silver substituted bismuth fluoride which would have improved F diffusion. In addition, the highly conductive silver may act as a fast transport pathway for the electrons to diffuse from the reaction zone during the formation and subsequent charge reactions.

Example 8

Example of Positive Electrode Metal+Nonmetal Composites: Bi+KF

The Bi—KF alloy positive reactive current collector was deposited in various ratios as depicted in Table 4.

TABLE 4

| Alloy | µAh Charge @ 200 nA | µAh Discharge |
|---|---|---|
| 0KF:1Bi (0KF:100Bi) | 0.2 | 4 |
| 1KF:8Bi (12.5KF:87.5Bi) | 11 | 7 |

Figure 14:
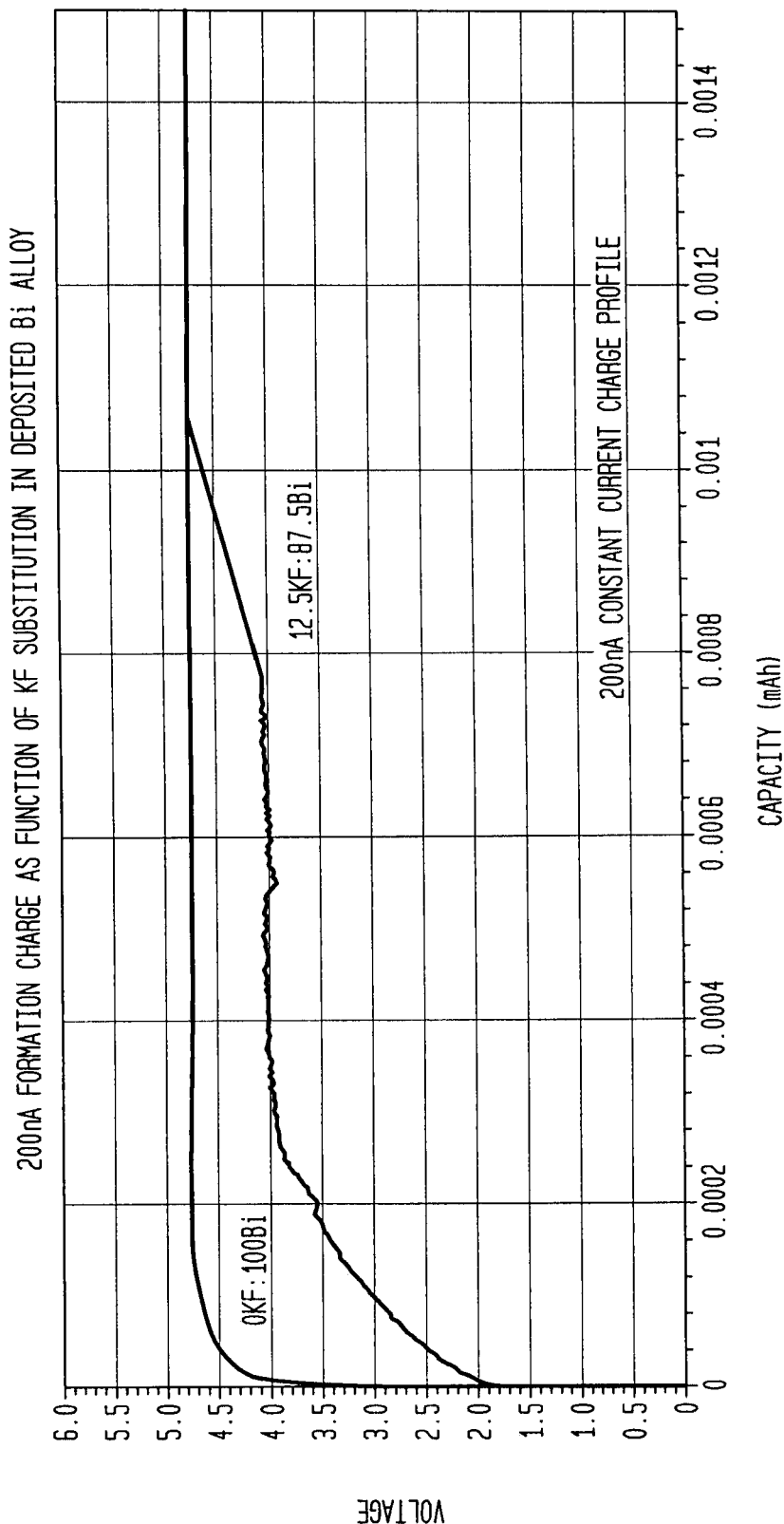
FIG. 14 shows a plot of voltage versus capacity (mAh) representing 200 nA formation charge as a function of KF substitution in deposited Bi alloy.

87.5 Bi along with 12.5 KF mixed positive reactive current collectors were fabricated. FIG. 14 shows a plot of voltage versus capacity (mAh) representing 200 nA formation charge as a function of KF substitution in deposited Bi alloy; the Bi—KF alloy positive reactive current collector was deposited in various ratios as depicted in Table 4. The data show significant improvement in the constant current voltage profile and resulting formation capacity and the following discharge capacity can be realized with addition of KF (see FIG. 14). This shows that the use of a metal/inorganic compound composite can be beneficial to the electrochemical activity of the invention.

Example 9

Example of Various Negative and Positive Electrode Metallization Composites

Figure 15A:
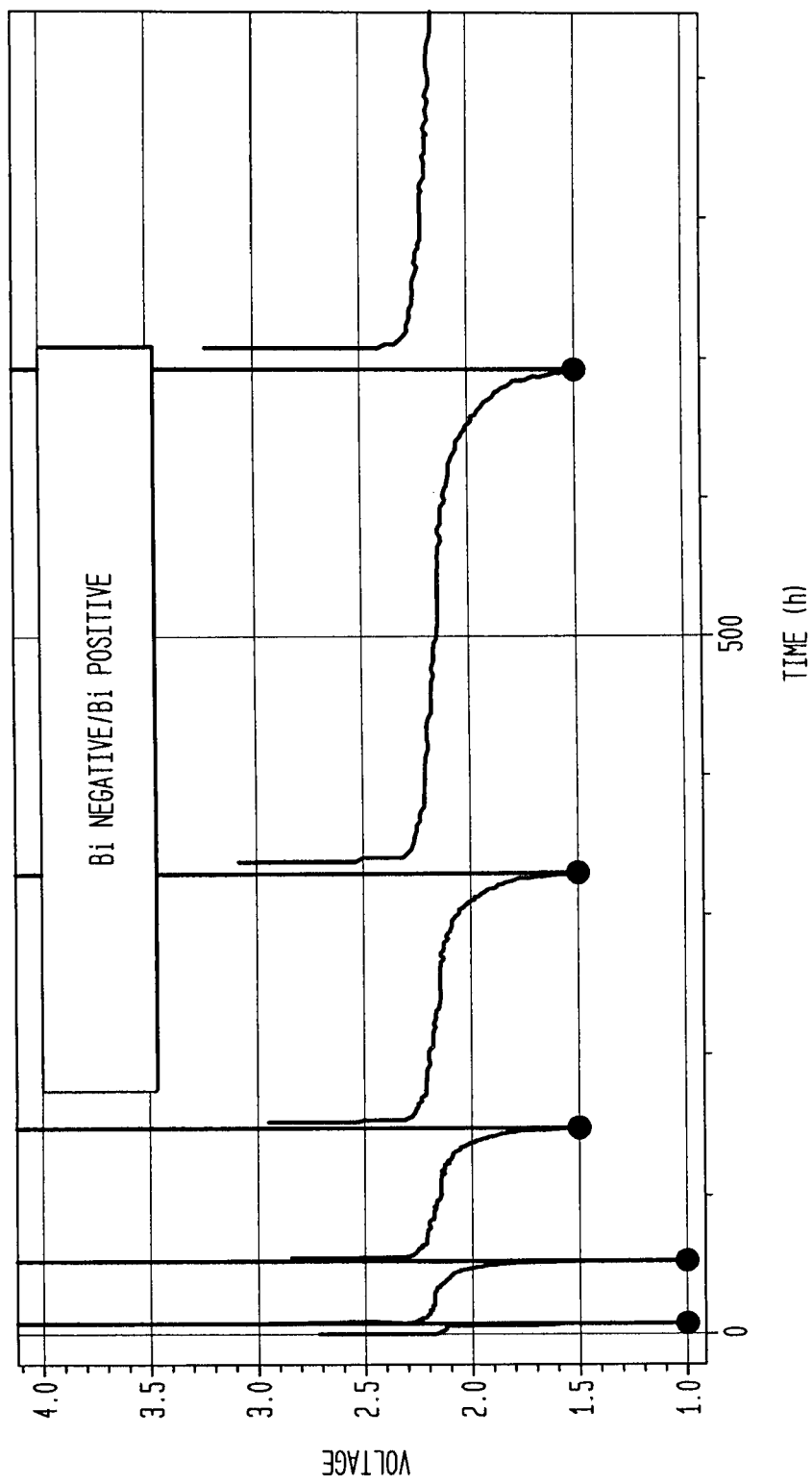
FIG. 15A shows a plot of voltage versus time (hour) of Bi negative/Bi positive current collector pairs utilizing amorphous LiF—$ZrF_4$ composition of approximately 90:1 after sequentially longer periods of cell formation.
Figure 15B:
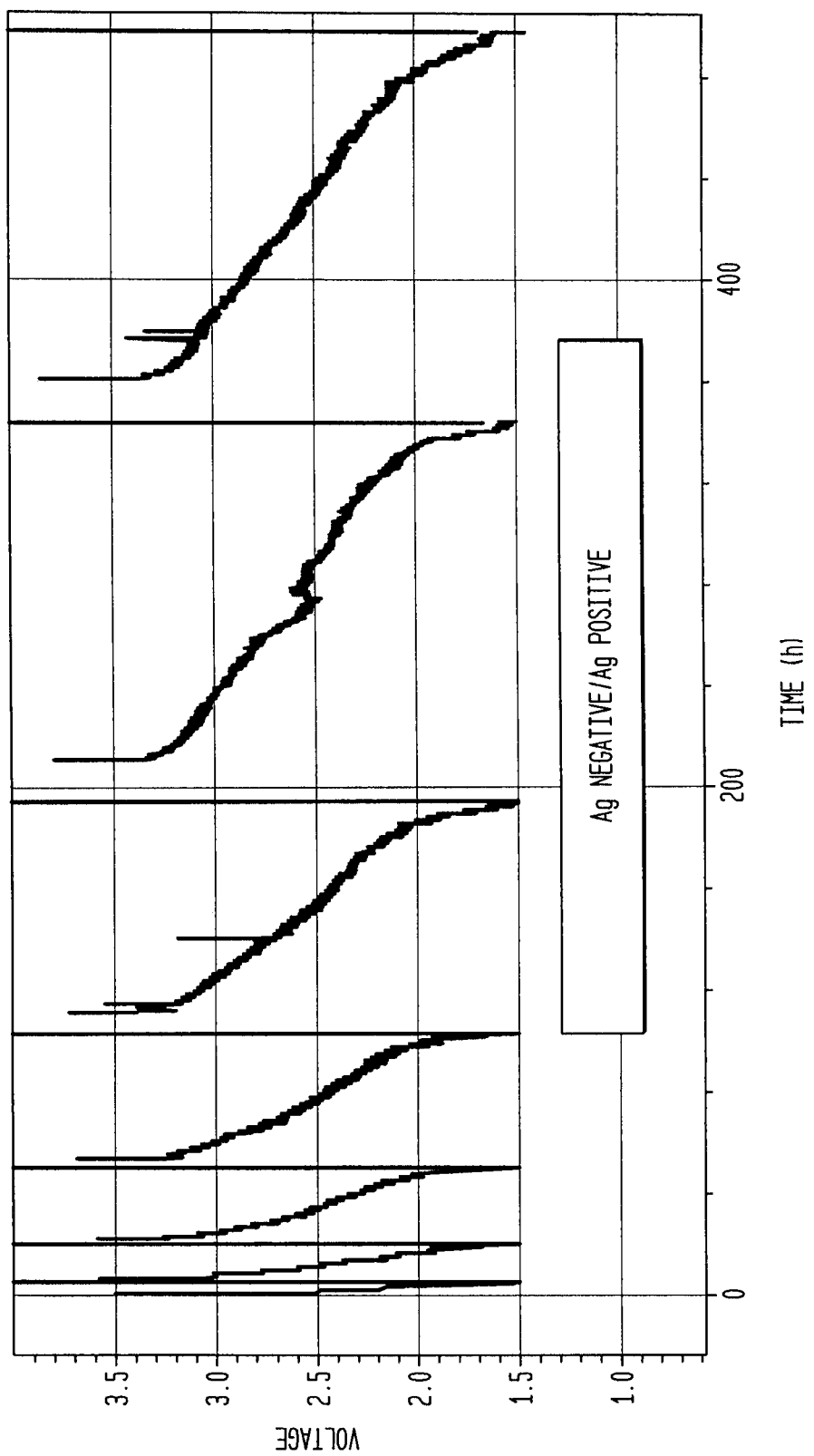
FIG. 15B shows a plot of voltage versus time (hour) of Ag negative/Ag positive current collector pairs utilizing amorphous LiF—$ZrF_4$ composition of approximately 90:1 after sequentially longer periods of cell formation.
Figure 15C:
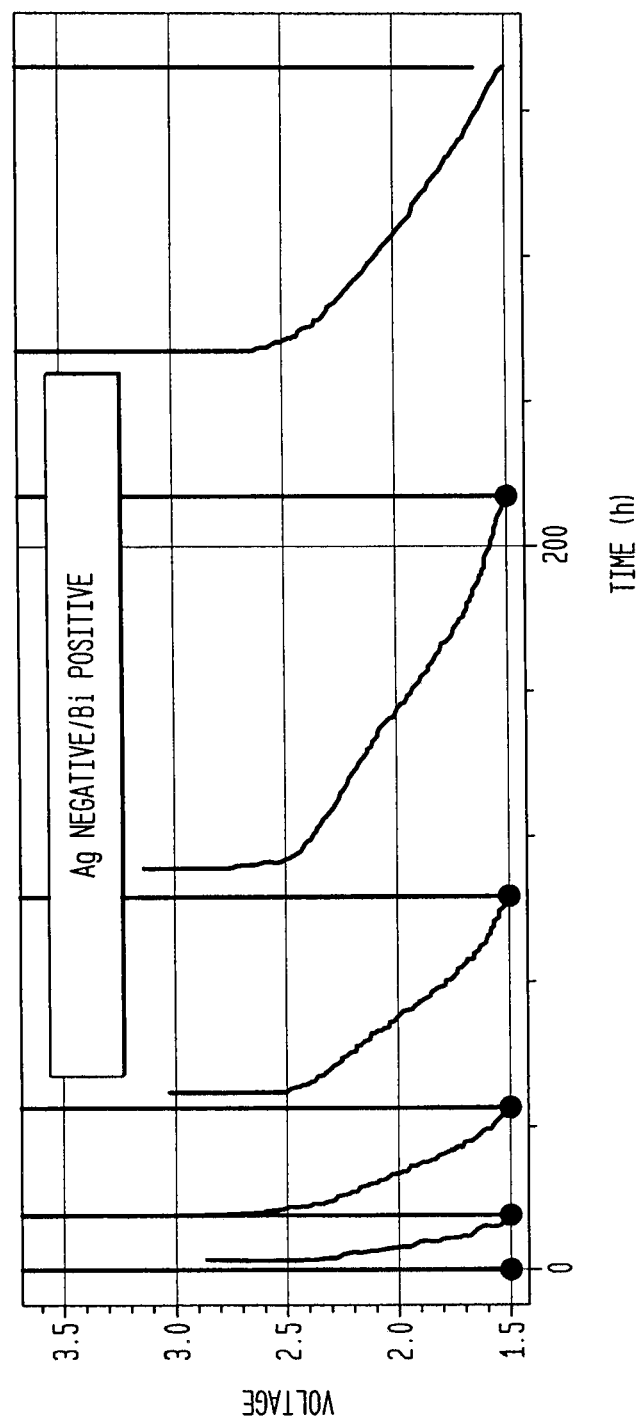
FIG. 15C shows a plot of voltage versus time (hour) of Ag negative/Bi positive current collector pairs utilizing amorphous LiF—$ZrF_4$ composition of approximately 90:1 after sequentially longer periods of cell formation.
Figure 15D:
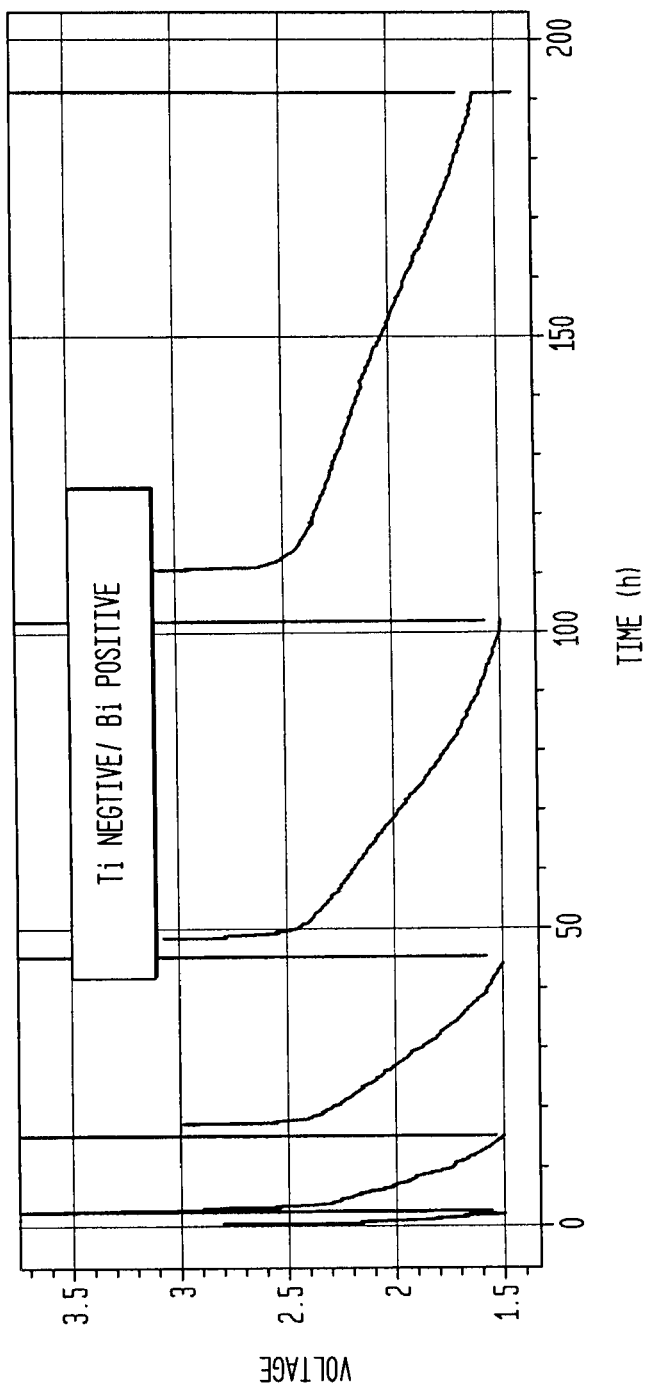
FIG. 15D shows a plot of voltage versus time (hour) of Ti negative/Bi positive current collector pairs utilizing amorphous LiF—$ZrF_4$ composition of approximately 90:1 after sequentially longer periods of cell formation.

Various negative/positive current collector pairs were deposited in a thickness of 500 nm to demonstrate the flexibility and influence of the chosen chemistries on the resulting electrochemical properties of the described invention. The cells were charged/formed at 5V for sequentially longer periods of time and discharged at 10 nA after each period. The resulting discharge curves are shown in FIG. 15. FIG. 15A shows a plot of voltage versus time (hour) of Bi negative/Bi positive current collector pairs utilizing amorphous LiF—ZrF$_4$ composition of approximately 90:1 after sequentially longer periods of cell formation. FIG. 15B shows a plot of voltage versus time (hour) of Ag negative/Ag positive current collector pairs utilizing amorphous LiF—ZrF$_4$ composition of approximately 90:1 after sequentially longer periods of cell formation. FIG. 15C shows a plot of voltage versus time (hour) of Ag negative/Bi positive current collector pairs utilizing amorphous LiF—ZrF$_4$ composition of approximately 90:1 after sequentially longer periods of cell formation. FIG. 15D shows a plot of voltage versus time (hour) of Ti negative/Bi positive current collector pairs utilizing amorphous LiF—ZrF$_4$ composition of approximately 90:1 after sequentially longer periods of cell formation. As can be seen from these data, the choice of current collector couple has a distinct impact on the average voltage and electrochemical utilization of the cell. The use of both Ag and Ti negative current collectors was found to result in higher voltages than that of Bi. Without being bound by theory, this is consistent with the expected voltages of plated Li on Ti, Li—Ag alloy, and Li—Bi in the post formed cell.

Figure 16:
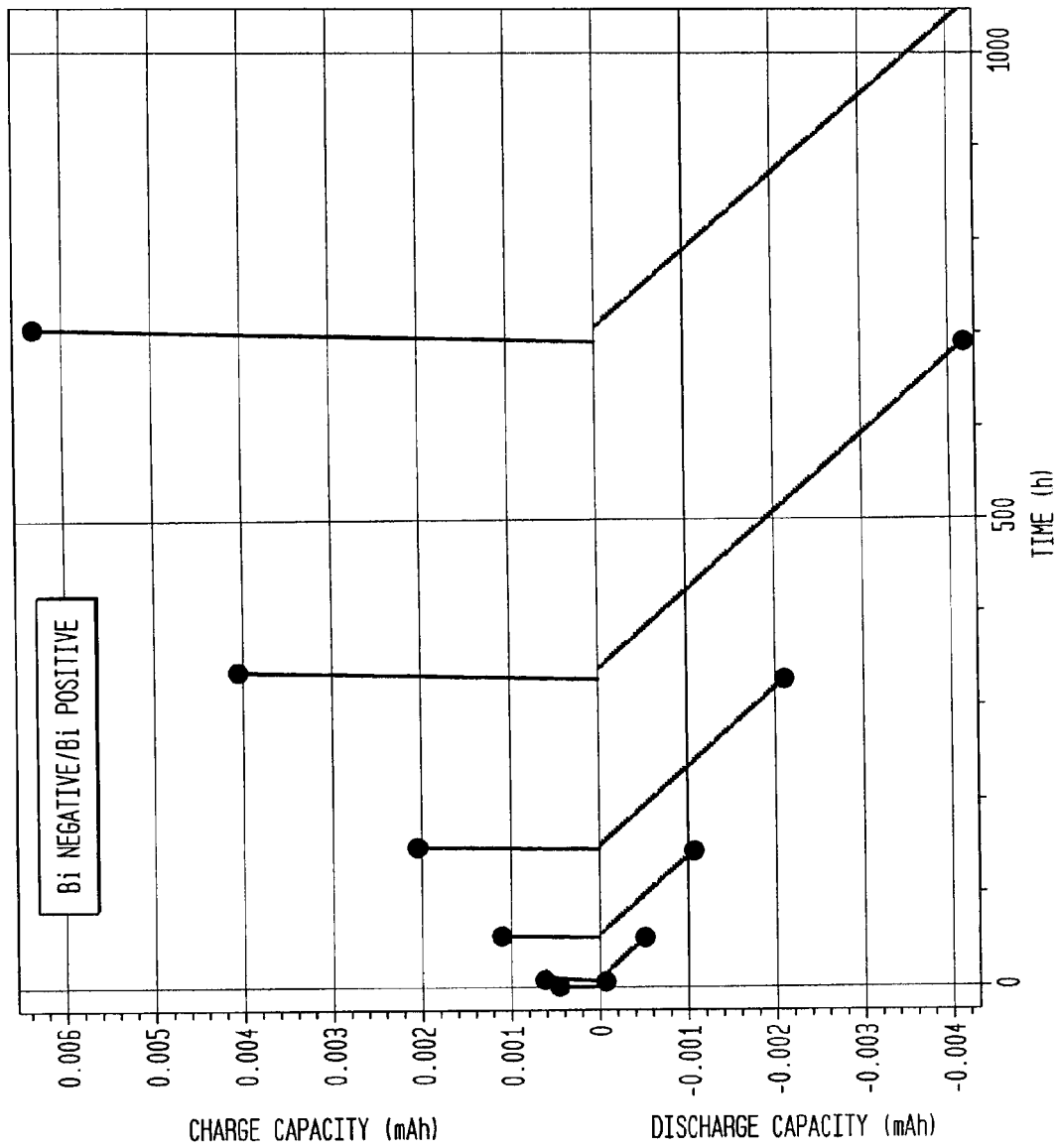
FIG. 16 shows a plot of (i) charge capacity (mAh) versus time (hour) and (ii) discharge capacity (mAh) versus time (hour) of the Bi negative/Bi positive current collector pair utilizing amorphous LiF—$ZrF_4$ composition of approximately 90:1 after sequentially longer periods of cell formation.

FIG. 16, which is an accounting of the accumulated charge and discharge capacities for the Bi/Bi couple of FIG.

15, shows a plot of (i) charge capacity (mAh) versus time (hour) and (ii) discharge capacity (mAh) versus time (hour) of the Bi negative/Bi positive current collector pair utilizing amorphous LiF—ZrF$_4$ composition of approximately 90:1 after sequentially longer periods of cell formation. An excellent agreement between the accumulated charge and discharge capacity can be seen for each cycle, showing that this invention displays excellent reversibility and efficient utilization of the charge current during the subsequent discharge.

While the described invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the described invention. All such modifications are intended to be within the scope of the claims appended hereto.

We claim:

1. A precursor for a self-formed battery, comprising
an amorphous or nanocrystalline mixed ionic conductor composition, including an alkali metal fluoride and a fluoride glass former composite;
a positive reactive current collector in contact with the composition; and
a negative reactive current collector in contact with the composition;
wherein the alkali metal fluoride: metal fluoride glass former molar ratio is in the range from 15:1 to 1:1, and wherein the composition is electronically insulating and forms in situ a negative electrode and a positive electrode when an electrical potential is applied thereto.

2. The precursor according to claim 1, wherein the composition conducts cations and anions as charge carriers.

3. The precursor according to claim 2, wherein the anions are fluoride anions.

4. The precursor according to claim 2, wherein the cations are cations of an alkali metal.

5. The precursor according to claim 4, wherein the alkali metal cations are lithium cations.

6. The precursor according to any one of claims 1, 2 and 3, wherein the alkali metal fluoride: metal fluoride glass former molar ratio is in the range from 10:1 to 2:1.

7. The precursor according to claim 6, wherein the alkali metal fluoride: metal fluoride glass former molar ratio is in the range from 9:1 to 2:1.

8. The precursor according to claim 1, wherein the fluoride glass former is selected from the group consisting of AlF$_3$, ZrF$_4$, GaF$_3$, HfF$_4$, YbF$_3$, ThF$_3$, ZnF$_2$ InF$_3$, UF$_3$, YF$_3$, and combinations thereof.

9. The precursor according to any one of claims 1, 2, and 3, wherein the composition further comprises a fluoride glass network modifier.

10. The precursor according to claim 9, wherein the akali metal fluoride: glass network modifier molar ratio is in the range from 20:1 to 1:1.

11. The precursor according to claim 10, wherein the glass network modifier is selected from the group consisting of LaF$_.$, BiF$_3$, PbF$_2$, KF, CaF$_2$, BaF$_2$, SnF$_2$, SrF$_{,2}$, or a rare earth metal fluoride.

12. The precursor according to claim 9, wherein the glass network modifier is selected from the group consisting of LaF$_3$, BiF$_3$, PbF$_2$, KF, CaF$_2$, BaF$_2$, SnF$_2$, SrF$_2$. or a rare earth metal fluoride.

13. The precursor according to claim 1, wherein the alkali metal fluoride is LiF.

14. The precursor according to claim 1, wherein the positive reactive current collector comprises at least one of Ag, Au, Bi, Pb, Sn, Cu, Pt, Pd, Fe, Mn, Ni, Mo, V or a combination thereof.

15. The precursor according to claim 14, wherein the positive reactive current collector further comprises at least one of La, Ca, Ba, Sr, O, and S.

16. The precursor according to claim 1, wherein the positive reactive current collector comprises carbon.

17. The precursor according to claim 16, wherein the carbon is in the form of one or both of a carbon nanotube or graphene.

18. The, precursor according to claim 1, wherein the negative reactive current collector comprises at least one of Ag, In, Al, Si, Sn, Ge, Mg, Au, Pd, Bi, Pb, graphite, carbon nanotubes, graphene, or a combination thereof.

19. The precursor according to claim 1, wherein the positive reactive current collector is a compositionally graded material that allows part of the positive reactive current collector to electrochemically oxidize to form the positive electrode or to electrochemically reduce to form the negative electrode.

20. The precursor according to claim 1 wherein the alkali metal fluoride: metal fluoride glass former molar ratio is in the range from 15:1 to 2:1.

21. The precursor according to claim 1 , wherein the negative reactive current collector is a compositionally graded material that allows part of the negative reactive current collector to electrochemically oxidize to form the positive electrode or to electrochemically reduce to form the negative electrode.

22. A precursor d battery, comprising
an amorphous or nanocrystalline mixed ionic conductor composition, including an alkali metal fluoride and a fluoride glass former composite;
a positive reactive current collector; and,
a negative reactive current collector,
wherein one of the positive reactive current collector and the negative current collector is in contact with the composition and the other of the positive current collector and the negative current collector is not in contact with the composition, and the alkali metal fluoride: metal fluoride glass former molar ratio is in the range from 15:1 to 1:1, and wherein the composition is electronically insulating and forms in situ a negative electrode and a positive electrode when an electrical potential is applied thereto.

23. The precursor according to claim 22, wherein the one of the positive reactive current collector and the negative current collector that is in contact with the position has a coating that includes the composition, the material further comprising a nonaqueous liquid electrolyte between the other of the positive current collector and the negative current collector and the coating.

* * * * *